United States Patent Office 3,591,607
Patented July 6, 1971

3,591,607
RETROSTEROID A-RING FORMATION
Andor Furst, Basel, and Wolfgang Koch, Riehen, Switzerland, and Milan Radoje Uskokovic, Upper Montclair, N.J., assignors to Hoffmann-La Roche Inc., Nutley, N.J.
No Drawing. Filed Apr. 19, 1966, Ser. No. 543,526
Int. Cl. C07c *171/07;* C07d *3/00*
U.S. Cl. 260—343.9                             10 Claims

ABSTRACT OF THE DISCLOSURE 3,5-seco-9β,10α steroids of the formula:

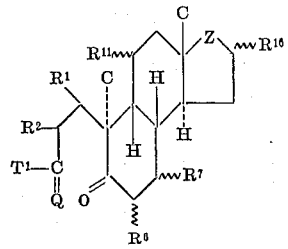

wherein:
$R^1$ is a member selected from the group consisting of hydrogen, lower alkyl, lower alkoxy, and lower alkylthio;
$R^2$ is a member selected from the group consisting of hydrogen, lower alkyl, lower alkoxy, and lower alkylthio;
$R^6$ is a member selected from the group consisting of hydrogen, lower alkyl, lower alkylthio, lower alkanoylthio, and halo;
$R^7$ is a member selected from the group consisting of hydrogen, lower alkyl, lower alkylthio, lower alkanoylthio, and halo;
$R^{11}$ is a member selected from the group consisting of hydrogen, hydroxy, and lower alkanoyloxy;
$R^{16}$ is a member selected from the group consisting of hydrogen, lower alkyl, hydroxy, lower alkoxy, lower alkanoyloxy, and, when the 17β-substituent is acetyl or substituted acetyl, fluorine;
Z is a member selected from the group consisting of carbonyl, (17β-hydroxy-17α-lower alkanoic acid lactone), and

$R^{17\beta}$ is a member selected from the group consisting of hydroxy, lower alkanoyloxy, and

Y is a member selected from the group consisting of hydrogen, halo, and hydroxy;
$R^{17\alpha}$, when $R^{17\beta}$ is hydroxy and lower alkanoyloxy, is a member selected from the group consisting of hydrogen and lower aliphatic hydrocarbyl, and, when $R^{17\beta}$ is

is a member selected from the group consisting of hydrogen, alkyl, hydroxy, lower alkanoyloxy, and halo;
Q, when taken alone, is oxo;
$T^1$, when taken alone, is a member selected from the group consisting of alkali metal oxy and lower alkoxy; and $T^1$ and Q, when taken together, are nitrilo. These compounds are intermediates which can be converted to a known class of endocrinologically active 9, 10-steroids.

This invention is concerned with the synthesis of retrosteroids and more particularly with a method for the formation of the A-ring of retrosteroids.
Recently, it was discovered that 10α-methyl-9β-steroids, or retrosteroids, have pharmacological activity which differs from that of the corresponding normal steroid; and, in general, retrosteroids have been found to produce certain desired pharmacological activities with substantially reduced or no side effects when compared with normal steroids.
In the past retrosteroids have been synthesized in low yields from normal steroids via irradiation. This treatment effects isomerization of the normal steroid nucleus to the 9β,10α-configuration, thereby forming a retrosteroid which can be employed as a pharmaceutical as such or converted by known techniques to other pharmacologically-active retrosteroids.
It is an object of this invention to provide a practical route and novel intermediates for the manufacture of retrosteroids having the general formula:

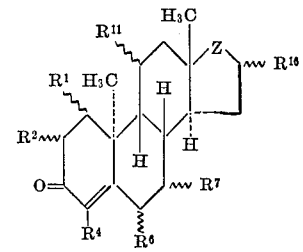

(I)

wherein $R^1$ is hydrogen, lower alkyl, lower alkoxy, or lower alkylthio; $R^2$ is hydrogen, lower alkyl, lower alkoxy, or lower alkylthio; $R^4$ is hydrogen or lower hydrocarbyl free from aliphatic, i.e., olefinic or acetylenic, unsaturation, e.g., lower alkyl or phenyl; $R^6$ is hydrogen, lower alkyl, lower alkylthio, lower alkanoylthio, or halo; $R^7$ is hydrogen, lower alkyl, lower alkylthio, lower alkanoylthio, or halo; $R^{11}$ is hydrogen, hydroxy, or lower alkanoyloxy; $R^{16}$ is hydrogen, lower alkyl, hydroxy, lower alkoxy, lower alkanoyloxy, or, when the 17β-substituent is acetyl or substituted acetyl, can also be fluorine; Z is carbonyl, (17β-hydroxy-17α-lower alkanoic acid lactone), or

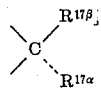

$R^{17\beta}$ is hydroxy, lower alkanoyloxy, or

Y is hydrogen, halo, or hydroxy; and $R^{17\alpha}$, and $R^{17\beta}$ is hydroxy or lower alkanoyloxy, is hydrogen or lower aliphatic hydrocarbyl, and, when $R^{17\beta}$ is

is hydrogen, alkyl, hydroxy, lower alkanoyloxy, or halo.

The compounds of Formula I may be further illustrated by subgeneric formulae:

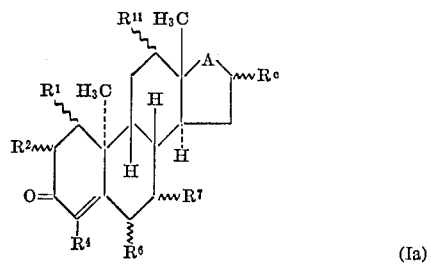

(Ia)

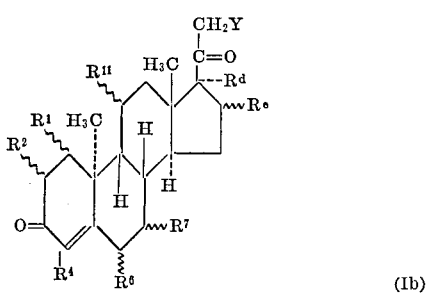

(Ib)

wherein $R^1$, $R^2$, $R^4$, $R^6$, $R^7$, $R^{11}$, and Y are as previously defined; A is carbonyl, (17β-hydroxy-17α-lower alkanoic acid lactone), or

$R^a$ is hydrogen or lower alkanoyl; $R^b$ is hydrogen or lower aliphatic hydrocarbyl; $R^c$ is hydrogen, lower alkyl, hydroxy, lower alkoxy, or lower alkanoyloxy; $R^d$ is hydrogen, lower alkyl, hydroxy, lower alkanoyloxy, or fluoro; and $R^e$ is hydrogen, lower alkyl, hydroxy, lower alkoxy, or halo.

Especially preferred products of the process of this invention are the 9β,10α-androst-4-en-3-ones of the formula.

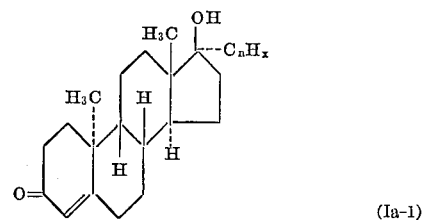

(Ia-1)

and their lower alkanoic acid esters and the 9β,10α-pregn-4-en-3-ones of the formula:

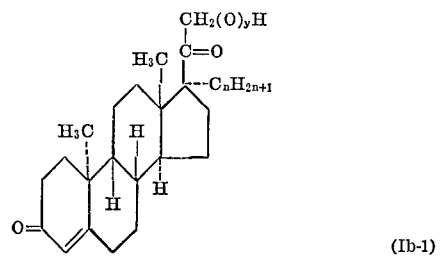

(Ib-1)

wherein $n$ is an integer having a value of from 0 to 6, $x$ is an integer having a value of $2n+1$, $2n-1$ or $2n-3$ and $y$ is an integer having a value of from 0 to 1.

As used herein, the term "lower," as applied to aliphatic hydrocarbyl groups, comprehends both straight and branched chain saturated and unsaturated hydrocarbon groups of up to about 6 carbons, including lower alkyl groups such as methyl, ethyl, propyl, isopropyl, and the like; lower alkenyl groups such as vinyl, and the like; and lower alkynyl groups such as as ethinyl, and the like. Similarly, the term "lower alkanoyl" comprehends groups such as acetyl, and the like; and the term "lower alkanoyloxy" comprehends groups such as acetoxy, and the like. The term "halogen" comprehends all four halogens, i.e., iodine, bromine, chlorine, and fluorine.

Illustrative of the products of the process of this invention are

17β-hydroxy-9β,10α-androst-4-en-3-one,
17β-hydroxy-17α-methyl-9β,10α-androst-4-en-3-one,
17β-hydroxy-17α-ethyl-9β,10α-androst-4-en-3-one,
17β-hydroxy-17α-hexyl-9β,10α-androst-4-en-3-one,
17β-hydroxy-17α-vinyl-9β,10α-androst-4-en-3-one,
17β-hydroxy-17α-hexenyl-9β,10α-androst-4-en-3-one,
17α-ethinyl-17β-hydroxy-9β,10α-androst-4-en-3-one,
17β-hydroxy-17α-hexinyl-9β,10α-androst-4-en-3-one, as well as their acetyl or benzoyl esters, 9β,10α-androst-4-ene-3,17-dione,
9β,10α-androst-4-en-3-one
17β-hydroxy-17α-acetic acid lactone,
9β,10α-pregn-4-ene-3,20-dione,
17α-hydroxy-9β,10α-pregn-4-ene-3,20-dione,
17α-methyl-9β,10α-pregn-4-ene-3,20-dione,
17α-ethyl-9β,10α-pregn-4-ene-3,20-dione,
17α-hexyl-9β,10α-pregn-4-ene-3,20-dione,
21-hydroxy-9β,10α-pregn-4-ene-3,20-dione, and the like.

The process of this invention employs a known sequence of reactions for the synthesis of the steroidal A-ring which broadly comprises (1) carboxyethylation of a tricyclic compound, (2) cyclization of the carboxethyl compound to form an enol lactone, (3) conversion of the enol lactone to an aldol, and (4) rearrangement and dehydration of the aldol to complete the formation of the steroid A-ring. It has been found by this invention that this sequence of reactions, when applied to certain tricyclic compounds, as hereinafter defined, provides a completely stereospecific synthesis of retrosteroids. The process of this invention is broadly illustrated by the following general reaction scheme:

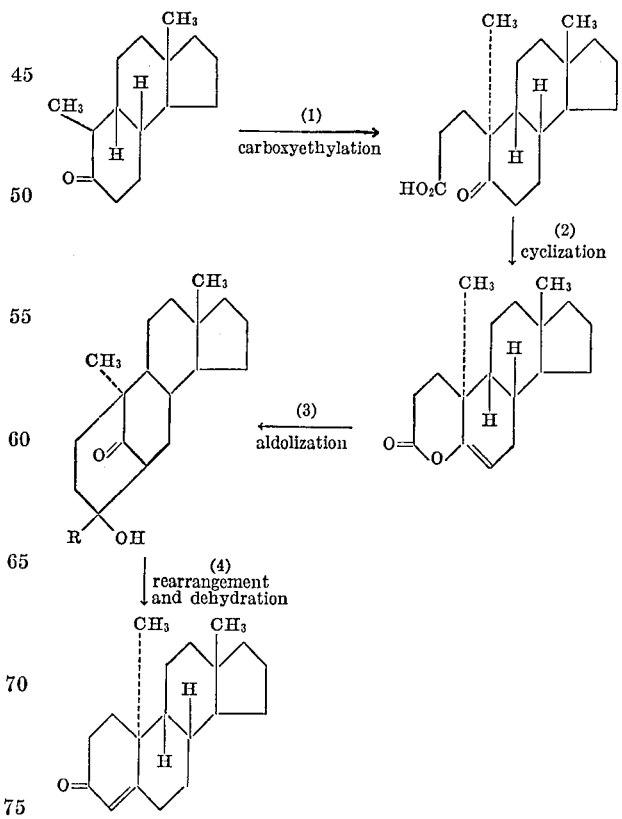

The tricyclic starting materials employed in the process of this invention are broadly illustrated by the formula:

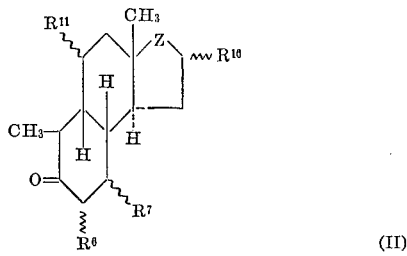

Subgeneric to these compounds are the desA-9β,10β-androstanes of the formula:

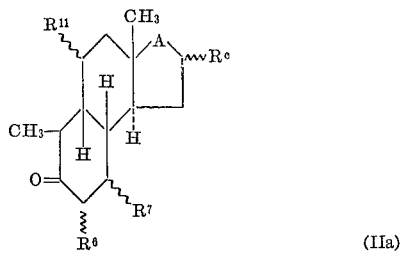

and the desA-9β,10β-pregnanes of the formula:

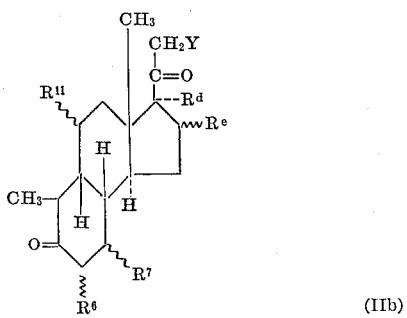

wherein $R^6$, $R^7$, $R^{11}$, $R^{16}$, $R^c$, $R^d$, $R^e$, A, Z, and Y are previously defined.

As will be appreciated, neither the specific reaction steps nor the reaction sequences of this invention involve any modification of substituents of the starting materials. However, in order to obtain unnatural 9β,10α-steroids of Formula I, it is necessary or desirable to protect certain of the substituents against one or more of the reaction steps involved. It is also convenient to initially protect such a substituent in the starting material and maintain the substituent in its protected form throughout the entire reaction sequence, regenerating the desired substituent only when the steroid of Formula I possessing the unnatural 9β,10α-configuration is obtained. On the other hand, it is sometimes convenient to insert a protecting group only before a certain reaction step or sequence of reaction steps. Said protecting group can then be maintained until the final reaction step or can be split off at some intermediate stage. The protecting groups can be inserted and split off by means known per se. The desirability of having protecting groups present will be further discussed below when the specific reaction steps are discussed in detail. The various substituents which are susceptible to being protected are exemplified by the 16-hydroxy group, the 17β-hydroxy group, the 17α-hydroxy or 20-oxo group, the 21-hydroxy group, or the 17-oxo group of a compound of Formula II.

The 17-oxo or 20-oxo group is suitably protected by ketalization, i.e., by reaction with a lower alkanediol, to yield a 17-lower alkylenedioxy or 20-lower alkylenedioxy compound, i.e., a 17-ketal or a 20-ketal.

The 16-hydroxy, 17α-hydroxy, 17β-hydroxy or 21-hydroxy moieties can be protected by esterificiation and/or etherification of the hydroxy group. Any available acid which will form an ester that can subsequently be hydrolyzed to regenerate the hydroxy group is suitable. Exemplary acids useful for this purpose are lower alkanoic acids, e.g., acetic acid, caproic acid, benzoic acid, phosphoric acid and lower alkyldicarboxylic acids, e.g., succinic acid. Also, protection for the 16α-hydroxy, 17α-hydroxy, or 21-hydroxy substituent can be effected by forming the lower alkyl ortho esters. Suitable ether protecting groups i.e., for example, the tetrahydropyranyl ether, the benzhydryl ether, the allyl ether, the benzyl ether, the trityl ether, the methoxymethyl ether, the tert.-butyl ether or lower alkyl ethers, such as the methyl ether.

In compounds containing the dihydroxyacetone side chain at C–17 (for example, compounds of Formula I wherein $R^{17a}$ is hydroxy), the side chain at C–17 can be protected by forming the 17,20; 20,21-bis-methylenedioxy group or by forming a 17,21-acetal or ketal group, or by forming a 17,21-diester. The 17,21-acetal or ketal and 17,21-diester hinder the 20-ketone group and minimize the possibility of its participating in unwanted side reactions. On the other hand, the 17,20; 20,21-bis-methylenedioxy derivatives actually convert the ketone to a nonreactive derivative. When both a 16α-hydroxy and 17α-hydroxy substituent are present, these groups can be protected via formation of a 16α,17α-acetal or ketal. The various protecting groups mentioned above can be removed by means known per se, for example, by mild acid hydrolysis.

In compounds wherein there is present neither a 17α-hydroxy nor 21-hydroxy substituent but there is present a 20-oxo group, the 20-oxo group can be protected via reduction to the corresponding carbinol (hydroxy) group. Thus, for example, the 17-acetyl side chain can be protected via conversion to a 17-(α-hydroxyethyl)-side chain. Regeneration of the 17-acetyl side chain can be simply effected via conventional oxidation means, for example, via oxidation with chromium trioxide in an organic solvent such as glacial acetic acid. Similarly in compounds containing a 17-oxo group, this group can be protected by reduction to the corresponding carbinol (hydroxy) group. Thus, the 17-oxo group can be reduced to a 17β-OH, 17α-H moiety, from which, when desired, the 17-oxo moiety can be regenerated by oxidation, as described above. Furthermore, a 20-hydroxy or 17β-hydroxy group, can itself be protected by esterification, for example, with a lower alkanoic acid such as acetic acid, caproic acid, or the like.

The 16α,17α- or 17α,21-acetals and ketals above discussed can be formed by reacting 16α,17α-bis-hydroxy or 17α,21-bis-hydroxy starting materials with an aldehyde or a ketone; preferably it is done by reacting a simple acetal or ketal (i.e., a lower alkyleneglycol acetal or ketal of a suitable aldehyde or ketone) with the moieties sought to be protected.

Suitable aldehydes and ketones include lower alkanals of at least two carbon atoms, such as paraldehyde propanal and hexanal; di(lower alkyl)ketones, such as acetone, diethylketone, dibutylketone, methylethylketone, and methylisobutylketone; cycloalkanones, such as cyclobutanone, cyclopentanone, and cyclohexanone; cycloalkyl (lower alkanals), such as cyclopentylcarboxaldehyde and cyclohexylcarboxaldehyde; cycloalkyl lower alkyl ketones, such as cyclopentyl propyl ketone, cyclohexylmethyl ethyl ketone; dicycloalkyl ketones, such as dicyclopentyl ketone, dicyclohexyl ketone, and cyclopentyl cyclohexyl ketone; cycloalkyl monocyclic aromatic ketones, such as cyclohexyl p-chlorophenyl ketone, cyclopentyl o-methoxyphenyl ketone cyclopentyl o,p-dihydroxyphenyl ketone and cyclohexyl m-tolyl ketone; cycloalkyl-lower alkyl monocyclic aromatic ketones, such as cyclopentylmethyl phenyl ketone; cycloalkyl monocyclic aromatic-lower akyl ketones, such as cyclopentyl benzyl ketone and cyclohexyl phenethyl ketone; cycloalkyl-lower alkyl monocyclic aromatic-lower alkyl ketones, such as cyclopentylmethyl benzyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g., p-chlorobenzaldehyde and p-fluorobenzaldehyde), lower alkoxybenzaldehydes (e.g., o-anisaldehyde) di(lower alkoxy) benzaldehydes (e.g., veratraldehyde), hydroxybenzaldehydes (e.g., salicylaldehyde), lower alkyl benzaldehydes (e.g., m-tolualdehyde and p-ethylbenzaldehyde), di(lower alkyl)-benzaldehydes (e.g., o,p-dimethylbenzaldehyde); monocyclic carboxylic aromatic lower alkanals, such as phenylacetaldehyde, α-phenylpropionaldehyde, β-phenylpropionaldehyde, 4-phenylbutyraldehyde, and aromatically substituted halo, lower alkoxy, hydroxy, and lower alkyl cyano derivatives thereof; monocyclic carbocyclic aromatic ketones, such as acetophenone, α,α,α-trifluoroacetophenone, propiophenone, butyrophenone, valerophenone, halophenyl lower alkyl ketones (e.g., p-chloroacetophenone and p-chloropropiophenone); (lower alkoxy-phenyl lower alkyl ketones (e.g., p-anisyl methyl ketone); di-(lower alkoxy)-phenyl lower alkyl ketones; hydroxy-phenyl lower alkyl ketones; (lower alkyl)-phenyl lower alkyl ketones (e.g., methyl p-tolyl ketone); di-lower alkyl)-phenyl lower alkyl ketones (o,p-xylyl methyl ketone); benzophenone, and mono- or bis-substituted halo, lower alkoxy, hydroxy, and lower alkyl derivatives thereof; monocyclic carbocyclic aromatic lower alkanones, such as 1-phenyl-3-butanone and 1-phenyl-4-pentanone, and aromatically substituted derivatives thereof.

Especially suitable are those aldehydes or ketones which, with the 16α,17α- or 17α,21-bis-hydroxy grouping form an acetal or ketal group of the formula:

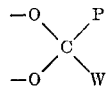

wherein P is individually selected from the group consisting of hydrogen and lower alkyl; W is individually selected from the group consisting of lower alkyl and aryl; and P and W taken together are lower alkylene.

The term "lower alkylene" comprehends polymethylene chains such as tetramethylene and pentamethylene.

In discussing the various starting materials, intermediates and end-products of this invention, the various protecting groups discussed above will not necessarily be specifically mentioned; but it should be understood that mention of any substituent comprehends the various protected forms thereof, unless specifically mentioned to the contrary.

The tricyclic starting materials of Formula II form no part of the presently claimed invention. Nevertheless, for convenience, methods for their synthesis are set forth below.

The desA-5-one tricyclic compounds of Formula II are generally produced either (a) by the hydrogenation of a desA-9-en-5-one having the formula:

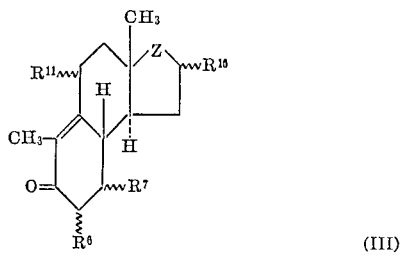

wherein $R^6$, $R^7$, $R^{11}$, $R^{16}$, and Z are as previously defined to produce a product having a saturated 17α-substituent or (b) by the hydrogenation of a 17-oxo-desA-9-en-5-one of Formula III followed by a Grignard reaction with an unsaturated hydrocarbyl Grignard reagent to provide an unsaturated 17α-substituent.

The hydrogenation, besides inserting a hydrogen atom in each of the 9- and 10-positions, can also simultaneously effect hydrogenation of other groups in the molecule. For example, a C–20-keto group can be hydrogenated to the corresponding carbinol or a C–17-lower alkenyl group or a C–17-lower alkynyl group can be hydrogenated to the corresponding C-17-lower alkyl group. Compounds of Formula II having a 17α-unsaturated hydrocarbon substituent can be prepared for 9β,10α-desA-17-oxo-androstan-5-one via reaction with a lower alkenyl or lower alkynyl Grignard reagent, with prior protection of the 5-keto group, for example, by forming 5-ketals without concurrent blocking of the 17-keto group.

The hydrogenation of the desA-androst-9-en-5-ones and the desA-pregn-9-en-5-ones is effected by catalytic hydrogenation, suitably using a precious metal catalyst. Especially preferred precious metal catalysts are palladium, platinum, and rhodium. It is particularly advantageous to use rhodium, for example, rhodium on charcoal or rhodium on alumina. This catalytic hydrogenation is suitably effected in an inert organic solvent, for example, a lower alkanol such as methanol or ethanol or ethanol, an ether such as dioxane or diglyme, a hydrocarbon such as cyclohexane, hexane, or the like. Moreover, it is suitably conducted in the presence of an acidic or basic catalyst, for example, an alkali metal or alkaline earth metal hydroxide such as sodium hydroxide, or the like, or a mineral acid, for example, a hydrohalide acid, such as hydrochloric acid, or the like. The reaction can be conducted at, above or below room temperature, for example, from about −5° C. to about 100° C. However, it is preferably conducted at a temperature between about 0° C. and about 35° C.

The desA-androst-9-en-5-ones or desA-17β-pregn-9-en-5-ones of Formula III can be prepared from natural steroids by a variety of methods. For example, the desA-androst-9-en-5-ones or desA-17β-pregn-9-en-5-ones can be prepared from natural steroids of the 3-oxo-androst-4-ene or 3-oxo-17β-pregn-4-ene series by a reaction sequence which involves as a first step an oxidative ring opening of ring A of the natural steroid. For this method there can be used as starting materials natural steroids of the 3-oxo-androst-4-ene or 3-oxo-17β-pregn-4-ene series of the formula:

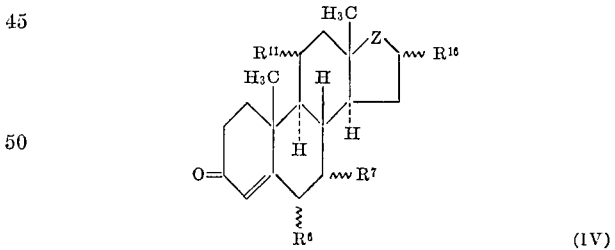

wherein $R^6$, $R^7$, $R^{11}$, $R^{16}$, and Z are as previously defined.

When $R^{11}$ is hydrogen, the oxidative ring opening of a natural steroid of Formula IV yields a 5-oxo-3,5-seco-A-norandrostan-3-oic acid or a 5-oxo-3,5-seco-A-norpregnan-3-oic acid of the formula:

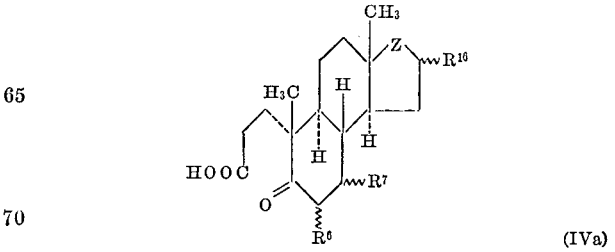

wherein $R^6$, $R^7$, $R^{16}$, and Z are as defined above.

When $R^{11}$ is hydroxyl, the oxidative ring opening yields an 11-hydroxy-5-oxo-3,5-seco-A-norandrostan-3-oic acid 3,11-lactone or an 11-hydroxy-3,5-seco-A-norpregnan-3-oic acid 3,11-lactone of the formula:

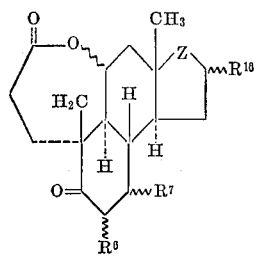

(IVb)

wherein $R^6$, $R^7$, $R^{11}$, and Z are as previously defined.

When $R^{11}$ is lower alkanoyloxy, the oxidative ring opening of a natural steroid of Formula IV yields a 5-oxo-3,5-seco-A-norandrostan-3-oic acid or a 5-oxo-3,5-seco-A-norpregnan-3-oic acid of the formula:

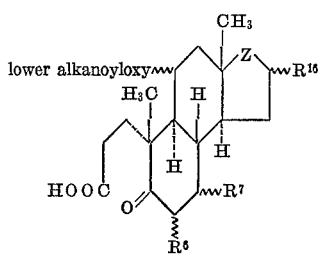

(IVc)

wherein $R^6$, $R^7$, $R^{16}$, and Z have the same meaning as above.

The oxidative ring opening of the compounds of Formula IV can be performed by a variety of methods. In a preferred embodiment it is effected by ozonolysis. The ozonolysis is suitably carried out in an organic solvent, for example, acetic acid, ethyl acetate, methanol, chloroform, methylene chloride, or the like, or a mixture of two or more of such solvents such as ethyl acetate/acetic acid, ethyl acetate/methylene chloride, or the like. Moreover, the ozonolysis is advantageously conducted at below room temperature. Thus, it is preferably conducted at a temperature between about −80° C. and about 25° C. The resulting ozonides can be decomposed by conventional means, for example, by treatment with water, hydrogen peroxide in water, acetic acid, or ethyl acetate, or the like. The oxidative ring opening of a compound of Formula IV to a compound of Formulae IVa, IVb, or IVc can also be effected by other oxidation means, for example, by treatment with hydrogen peroxide. It should be noted that an oxidative ring opening by either ozonolysis or by treatment with hydrogen peroxide does not require protection of any of the substituents at C-16 or C-17. However, as stated above, it may be desirable to protect these substituents against some subsequent reaction in the total reaction sequence being practiced. On the other hand, the oxidative ring opening can also be effected by oxidation with chromium trioxide or via treatment with sodium periodate and potassium permanganate in potassium carbonate solution; and if these oxidation means are used, it is necessary to protect any secondary hydroxy groups which might be present such as a 16-, 17β-, or 21-hydroxy group, preferably, for the purpose of this reaction, with nonaromatic protecting groups.

Following the oxidative ring opening of the A-ring, the so-obtained 5-oxo-3,5-seco-A-norandrostan-3-oic acid or 5-oxo-3,5-seco-A-norpregnan-3-oic acid of Formula IVa may be converted into a mixture of a 10α-desA-androstan-5-one and a 10β-desA-androstan-5-one or a mixture of a 10α-desA-pregnan-5-one and a 10β-desA-pregnan-5-one as illustrated by the formula:

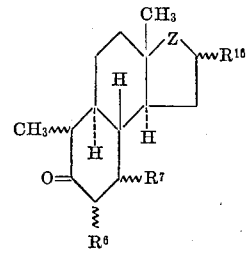

(IVd)

wherein $R^6$, $R^7$, $R^{16}$, and Z have the same meaning as above.

The conversion of a compound of Formula IVa into the compounds of Formula IVd is effected by pyrolysis. Prior to effecting the pyrolysis, it is desirable to convert the 3-oic acid of Formula IVa into a corresponding metal salt, for example, an alkali metal salt such as the sodium salt. The pyrolysis can be conducted at atmospheric pressure or in a vacuum, but it is preferably conducted in a vacuum, at a temperature of from about 200° C. to about 350° C. in the presence of a proton acceptor, e.g., an alkali metal or alkaline earth metal salt of a weak organic acid, for example, potassium acetate, sodium acetate, sodium phenyl acetate, sodium bicarbonate, or the like. Especially preferred is a vacuum of from about 0.001 to about 0.5 mm. Hg. Accordingly, it is advantageous to conduct the pyrolysis under alkaline conditions, i.e., at a pH greater then 7.

It should be noted that though the pyrolysis of a compound of Formula IVa yields both 10β-compounds and 10α-compounds, and though either of these isomers can be used in the subsequent halogenation and dehydrohalogenation steps of this reaction sequence, it is sometimes preferable to convert the 10β-compound of Formula IVd into the corresponding 10α-compound. This conversion can be effected by treating a 10β-desA-androstan-5-one or 10β-desA-pregnan-5-one of Formula IVd with any base capable of producing a carbanion; for example, it is suitable to use an alkali metal lower alkoxide in an organic solvent such as a lower alkanol, for example, sodium ethoxide in an ethanol solution or sodium methoxide in a methanol solution.

The above-discussed conversion via the alkali metal salt and pyrolysis of compounds of Formula IVa to compounds of Formula IVd can be effected without protection of any of the substituents which might be present at C-16 or C-17. However, if it is desired for either preceding or succeeding reaction steps of the total reaction sequence, the conversion of a compound of Formula IVa to compounds of Formula IVd can be effected with protecting groups present on substituents in the C-16 or C-17 position.

Compounds of Formula IVd can also be formed from a compound of Formula IVa via the formation of an enol-lactone of a compound of Formula IVe, i.e., via the formation of a 4-oxo-androst-5-en-3-one or a 4-oxo-pregn-5-en-3-one of the formula:

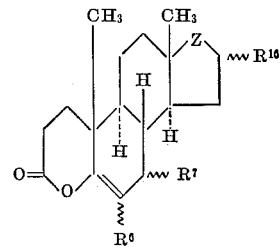

(IVe)

wherein $R^6$, $R^7$, $R^{16}$, and Z have the same meaning as above, which can then be reacted with a Grignard reagent, such as phenyl magnesium bromide or phenyl lithium, to form the resulting aldol of, for example, the formula:

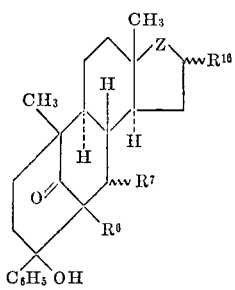

(IVf)

wherein $R^6$, $R^7$, $R^{16}$, and Z have the same meaning as above, which, upon treatment with an alkali metal hydroxide, such as potassium hydroxide, at an elevated temperature, for example, from about 200° C. to about 240° C., is converted to the corresponding 10α-desA-androstan-5-one or 10α-desA-pregnan-5-one of Formula IVd.

The lactones of Formula IVb can be treated with an alkali metal hydroxide such as sodium hydroxide to give the salt of the same keto acid. Without isolation, this salt can then be subjected to pyrolysis yielding a mixture of an 11-hydroxy-10α-desA-androstan-5-one and an 11-hydroxy-10β-desA-androstan-5-one or a mixture of an 11-hydroxy-10α-desA-pregnan-5-one and an 11-hydroxy-10β-desA-pregnan-5-one, as illustrated by the formula:

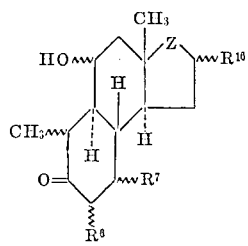

(IVg)

wherein $R^6$, $R^7$, $R^{16}$, and Z have the same meaning as above. This pyrolysis of the alkali metal salt derived from a compound of Formula IVb can be effected under the same conditions as described above for the pyrolysis of a compound of Formula IVa to compounds of Formula IVd. Both the 10β-compounds and the 10α-compounds of Formula IVg can be subjected to the subsequent steps of this reaction sequence.

As the next step in this sequence, the compounds of Formula IVg may be esterified with an organic carboxylic acid, for example, a lower alkanoic acid such as acetic acid, benzoic acid, and the like, to provide an ester of the formula:

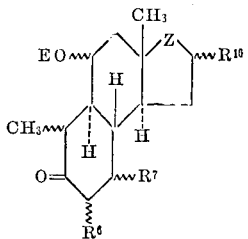

(IVh)

wherein $R^6$, $R^7$, $R^{16}$, and Z are as previously defined and E represents the acid residue.

The 10α-desA-androstan-5-ones or 10α-desA-pregnan-5-ones or the 10β-desA-androstan-5-ones or 10β-desA-pregnan-5-ones of Formula IVd or their corresponding 11-alkanoyloxy esters of Formula IVh can be converted via a two-step sequence of halogenation and dehydrohalogenation into the desired starting material desA-androst-9-en-5-one or desA-pregn-9-en-5-one of Formula III.

In a preferred embodiment a 10α-desA-androstan-5-one or a 10α-desA-pregnan-5-one of Formulae IVd or IVh is subjected to the two-step sequence of halogenation and dehydrohalogenation. Halogenation of a compound of Formulae IVd or IVh yields a mixture of corresponding halogenated compounds including one of the formula:

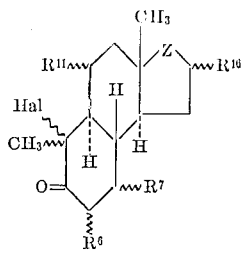

(IVi)

wherein $R^6$, $R^7$, $R^{11}$, $R^{16}$, and Z have the same meaning as above, and Hal is a halogen atom (preferably Br or Cl).

Dehydrohalogenation of a compound of Formula IVi then yields a desired starting material of Formula III. Keto groups, except for the 5-keto group, may require protection prior to the halogenation. In the case of compounds containing the C–17 dihydroxyacetone side chain, wherein $R^{17a}$ is hydroxy, this protection can be effected by formation of the 17α,20;20,21-bis-methylenedioxy derivative. In other cases wherein a C–17 oxo or C–20 oxo group is present, protection can be effected by reduction to the corresponding carbinol either directly prior to the halogenation step or prior to some other step in the reaction sequence leading to the compounds of Formulae IVd or IVh.

The halogenation can be effected with halogenating agents such as bromine, sulfuryl chloride, or the like. Bromination is especially preferred. The bromination is suitably effected by treatment with bromine at room temperature or below, preferably at ice temperature or below. Suitably it is conducted in an organic medium; for example, an organic acid such as acetic acid; in ether such as an anhydrous ether, dioxane, tetrahydrofuran; a chlorinated organic solvent such as methylene chloride, chloroform, carbon tetrachloride; or the like; with the addition of hydrogen bromide as a catalyst.

The subsequent dehydrohalogenation of a compound of Formula IVi is preferably conducted under mild dehydrohalogenating conditions; for example, by the use of an alkali metal carbonate (e.g., lithium carbonate) or an alkali metalhalogenide (e.g., a lithium halide) in an organic solvent such as a di(lower alkyl)formamide, or with an organic base such as collidine, pyridine, or the like. The dehydrohalogenation is advantageously conducted at slightly elevated temperatures, for example, about 50° C. to about 150° C., preferably from about 80° C. to about 120° C.

Separation of the desired product desA-androst-9-en-5-one or desA-pregn-9-en-5-one can be effected by conventional means. The halogenation procedure may result in halogenated by-products in addition to the desired intermediate of Formula IVi. Accordingly, the separation is preferably effected after first subjecting the reaction mixture to dehalogenating conditions in order to dehalogenate the halogenated by-products formed by the halogenation procedure, but not dehalogenated by the dehydrohalogenation. Following such dehalogenation and reaction mixture can then easily be separated by conventional means, for example, by column chromatography, to yield the desired compound. An exemplary dehalogenation means is treatment with zinc and sodium acetate in an acetic acid solution at an elevated temperature, for example, about 80° C.

In the case of compounds which contain a halogen atom on a carbon atom directly adjacent to a keto group, it is preferable to protect such a halogen atom against dehalogenation prior to subjecting the compound to the two-step sequence of halogenation and dehydrohalogenation of this embodiment. This protection can be effected, for example, by ketalization of the keto group.

As an alternative route to compounds of Formula III, the 11-hydroxy compound of Formula IVg can be subjected to esterification to convert the 11-hydroxy group to a leaving group in the 11-position. This esterification can be effected with an acid or a reactive derivative thereof to form a leaving group in the 11-position. By "reactive derivative" is meant, for example, a halide, e.g., a chloride, an anhydride, or the like. Prior to the esterification reaction, it is preferable to protect hydroxy groups present in the C–16, C–17, or C–21 position. Suitable acids for the esterification of the 11-hydroxy group, which can be used to form a leaving group in the 11-position, are inorganic acids such as phosphoric acid; organic carboxylic acids such as anthraquinone β-carboxylic acid; or organic sulfonic acids, for example, toluenesulfonic acids, especially p-toluene-sulfonic acid; lower alkylsulfonic acids such as methanesulfonic acid and nitrophenylsulfonic acids, especially p-nitrophenylsulfonic acid. Especially preferred as the leaving group in the 11-position is a lower alkylsulfonyloxy group such as the mesoxy group. The above-described esterification of the 11-hydroxy compounds of Formula IVg yields compounds of the formula:

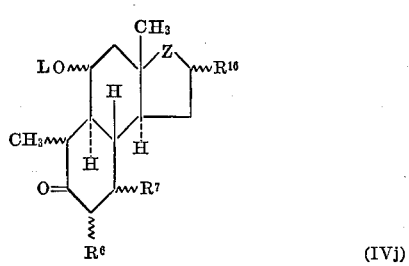

(IVj)

wherein $R^6$, $R^7$, $R^{16}$, and Z are as defiend above and LO represents the leaving group.

The leaving group can then be eliminated from the 11-position of a compound of Formula IVj resulting in a direct formation of a desA-androst-9-en-5-one or a desA-pregn-9-en-5-one of Formula III. This elimination can be effected by any conventional elimination means. It is suitably conducted under alkaline conditions in an anhydrous organic solvent. Preferably, it is effected by heating, i.e., at a temperature between about room temperature and the reflux temperature of the reaction mixture. Thus, treatment of a compound of Formula IVj with either an inorganic or organic base results in the formation of the desired compound of Formula III. Preferably a weak base is used, for example, a salt of a carboxylic acid (e.g., a lower alkanoic acid) with an alkali metal or an alkaline earth metal, for example, sodium acetate, potassium acetate, or the like. As indicated, the elimination is suitably conducted in an anhydrous organic solvent; suitable are solvents such as di-lower alkylformamides, e.g., dimethylformamide; lower alkanoic acids, e.g., acetic acid; or the like. When a proton-accepting solvent, such as dimethylformamide, is used, it itself can serve as the base for the purpose of this elimination reaction; i.e., if the solvent is basic, then the elimination can be conducted without the addition of a separate basic material.

An alternative route to the tricyclic materials from an 11-hydroxy steroid of Formula IV comprises first converting the 11-hydroxy group to a leaving group by esterification, as described above, thereby forming a compound of the formula:

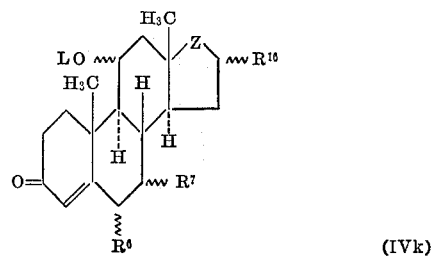

(IVk)

wherein $R^6$, $R^7$, $R^{16}$, and Z have the same meaning as above, and LO represents the leaving group.

The so-formed 11-(esterified hydroxy)-compound of Formula IVk is subjected to an oxidative ring opening of the A-ring to yield the corresponding 11-(esterified hydroxy)-5-oxo-3,5-seco-A-norandrostan-3-oic acid or 11-(esterified hydroxy)-5-oxo-3,5-seco-A-norpregnan - 3 - oic acid of the formula:

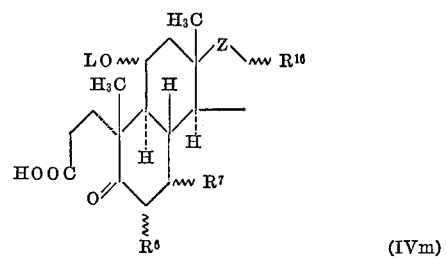

(IVm)

wherein $R^6$, R7, $R^{16}$, Z and LO have the same meaning as above.

The oxidative ring opening of the A-ring can be effected by ozonolysis as described above for the oxidative ring opening of the A-ring of a compound of Formula IV. Pyrolysis of the so-formed compound of Formula IVm under the conditions described above for the pyrolysis of a compound of Formula IVa directly yields the desired desA - androst - 9 - en-5-one or desA-pregn-9-en-5-one of Formula III. Thus, pyrolysis of a compound of Formula IVm directly results in elimination of the leaving group in the 11-position as well as a splitting off of the residue of ring A attached to the 10-position. This procedure of starting from an 11-hydroxy steroid (preferably 11α-hydroxy) of Formula IV and proceeding through intermediates of Formulae IVk and IVm to compounds of Formula III represents a particularly elegant procedure for preparing the latter compounds.

Compounds of Formula IVd also can be prepared from compounds of the formula:

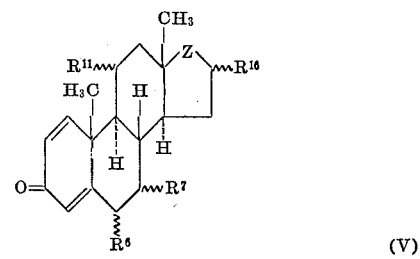

(V)

wherein $R^6$, $R^7$, $R^{11}$, $R^{16}$, and Z have the same meaning as above, in the same manner that compounds of Formula IVd are prepared from compounds of Formula IV, i.e., by oxidative ring opening, for example, ozonolysis of the A-ring of a compound of Formula V followed by elimination of the residue of the A-ring, to yield a compound of Formula IVd. Ozonolysis of a compound of Formula V, wherein $R^{11}$ is hydrogen, yields a compound of the formula:

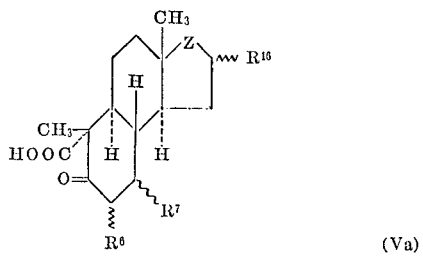

(Va)

wherein $R^6$, $R^7$, $R^{16}$, and Z have the same meaning as above.

A compound of Formula Va can then be converted to a compound of Formula IVd by removal of the residue of the A-ring, i.e., decarboxylation, by heating in an acidic or basic medium. It is preferred to heat to the reflux temperature of the medium which is preferably an inert organic solvent such as a lower alkanol, e.g., ethanol, dioxane, ether, or the like. The decarboxylation yields mainly a 10α-isomer of Formula IVd but also a minor yield of the corresponding 10β-isomer.

Compounds of Formula V, wherein $R^{11}$ is a hydroxy group, can be esterified to form compounds of the formula:

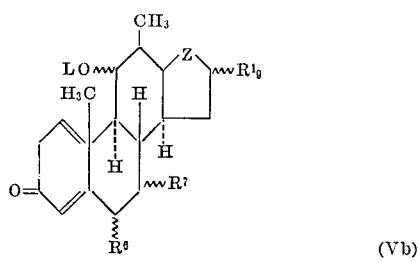

(Vb)

wherein $R^6$, $R^7$, $R^{16}$, Z and LO have the same meaning as above.

The compounds of Formula Vb can be prepared from corresponding 11-hydoxy compounds by esterification as described above for the preparation of compounds by esterification as described above for the preparation of compounds of Formula IVj from compounds of Formula IVg. The compounds of Formula IVd can be prepared from compounds of Formula Vb in the same manner that compounds of Formula IVd are prepared from compounds of Formula Va, i.e., by oxidative ring opening of the A-ring of a compound of Formula Vb followed by elimination of the residue of the A-ring to yield a compound of Formula IVd. The oxidative ring opening of the compounds of Formula Vb can be performed by ozonolysis, which yields a compound of the formula:

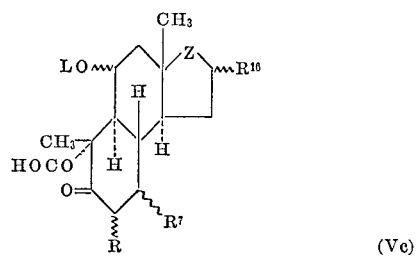

(Vc)

wherein $R^6$, $R^7$, $R^{16}$, Z and LO have the same meaning as above.

A compound of Formula Vc can then be converted to a compound of Formula IVj. This removal of the residue of the A-ring, i.e., decarboxylation, can be effected as described above for the conversion of a compound of Formula IVa to a compound of Formula IVd.

The first step in the process of this invention comprises the carboxyethylation of the tricyclic compound of Formula II by the base-catalyzed reaction of the tricyclic compound of Formula II with a compound of the formula:

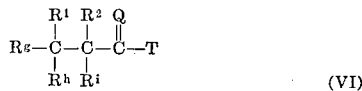

(VI)

wherein $R^1$ and $R^2$ are as previously defined; Q, when taken alone, is oxo; T, when taken alone, is hydroxy, alkali metal oxy, or lower alkoxy; Q and T, when taken together are nitrilo ($\equiv$N); $R^g$, when taken alone, is hydrogen or hydroxy, and is hydroxy only when —CQT is carboxy; T and $R^g$ when taken together, are oxy; and $R^h$ and $R^i$, when $R^g$ is hydrogen, form a carbon-carbon bond, or, when $R^g$ is hydroxy, or $R^g$ and T together are oxo, are both hydrogen.

Thus, the compounds represented by Formula VI include, α,β-unsaturated nitriles:

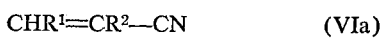

$$CHR^1=CR^2—CN \qquad (VIa)$$

α,β-unsaturated acids, their lower alkyl esters, or alkali metal salts:

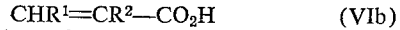
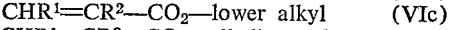
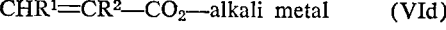

| | |
|---|---|
| $CHR^1=CR^2—CO_2H$ | (VIb) |
| $CHR^1=CR^2—CO_2$—lower alkyl | (VIc) |
| $CHR^1=CR^2—CO_2$—alkali metal | (VId) |

β-hydroxy acids:

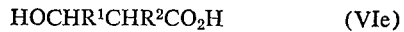

$$HOCHR^1CHR^2CO_2H \qquad (VIe)$$

and β-lactones:

(VII)

Illustrative examples of suitable compounds of Formula VI include nitriles such as acrylonitrile, methacrylonitrile, ethacrylonitrile, crotononitrile, α-methoxyacrylonitrile, β-methoxyacrylonitrile, α-methylthioacrylonitrile, β-methylthioacrylonitrile, and the like; acids such as acrylic acid, methacrylic acid, ethacrylic acid, crotonic acid, α-methoxyacrylic acid, α-methylthioacrylic acid, and the like; as well as the lower alkyl, for example, methyl or ethyl, esters; or alkali metal, for example, sodium or potassium, salts of these acids; β-hydroxy acids such as β-hydroxypropionic acid, β-hydroxybutyric acid, and the like; and β-lactones such as β-propiolactone, β-butyrolactone, α-methyl-β-propiolactone, α-methoxy - β - propiolactone, α-methylthio-β-propiolactone, and the like.

Base catalysts which can be employed in this step include organic bases, including quaternary ammonium hydroxides such as benzyltrimethylammonium hydroxide, and the like, and alkali metal alkoxides such as sodium methoxide, potassium tert.-butoxide, and the like; and inorganic bases such as alkali metal hydroxides or hydrides, for example, sodium hydroxide, potassium hydroxide, or sodium hydride.

The temperature of the base-catalyzed reaction is not critical and temperatures of from between 0° C. and lower to 200° C. and higher are suitable, with temperatures of from about 0° to 70° C. being preferred. It is preferred that the reaction be conducted in the presence of an inert organic solvent, i.e., a solvent which will not react with either the compound of Formula II or Formula VI. For example, when acrylonitrile is employed as the compound of Formula VI, acetonitrile or ketones cannot be employed as solvents. Preferred solvents include benzene, ether, dioxane, or lower alkanols, such as methanol, ethanol, and the like.

In this reaction, when $R^6$ of the compound of Formula II is hydrogen, it is preferred that the 6-position be protected, for example, by condensation of the tricyclic compound of Formula II with ethyl formate to form a hydroxymethylene ketone and then condensation with methyl aniline to form a methylanilinomethylene ketone or with a thiol, such as an alkyl mercaptan, e.g. n-butyl mercaptan, an aralkyl mercaptan, e.g. benzyl mercaptan, an aryl mercaptan, e.g. thiophenol, to form an S-substituted thiomethylene ketone. These protecting groups are readily removed by basic hydrolysis. Absent such protecting groups, the compound of Formula II may be attacked in the 6-position.

The products of the base-catalyzed reaction are novel compounds which are represented by the formula:

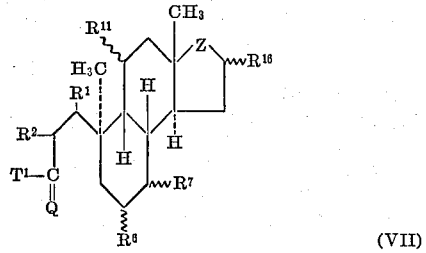

(VII)

wherein $R^1$, $R^2$, $R^6$, $R^7$, $R^{11}$, $R^{16}$, Q, and Z are as previously defined; $T^1$, when taken alone, is alkali metal oxy or lower alkoxy; and $T^1$ and Q, when taken together, are nitrilo.

Thus, the immediate products of the reaction are nitriles, or salts or esters of carboxylic acids, which must be converted to the corresponding novel acids represented by the formula:

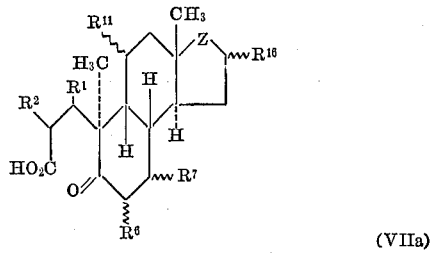

(VIIa)

wherein $R^1$, $R^2$ $R^6$, $R^7$, $R^{11}$, $R^{16}$, and Z are as previously defined.

The alkali metal salts of Formula VII are readily converted to their acids by acidification of the reaction mixture. Both the nitrile sand the esters, however, must be saponified, as by reaction with an alkali metal hydroxide, to form a carboxylic acid salt, followed by acidification. The saponification, when required, may be conducted in a suitable solvent such as water, alcohols, dioxane, or mixtures thereof. The reaction temperature is not critical, and can range from 0° C. or lower to 200° C. or higher, with temperatures of from 50° C. to 100° C. being preferred.

Illustrative of the compounds of Formulae VII and VIIa are androstanes such as

17β-hydroxy-5-oxo-3,5-seco-A-nor-9β,10α-androstane-3-nitrile,
17β-acetoxy-5-oxo-3,5-seco-A-nor-9β,10α-androstane-3-nitrile,
17β-benzoyloxy-5-oxo-3,5-seco-A-nor-9β,10α-androstane-3-nitrile,
17β-hydroxy-17α-methyl-5-oxo-3,5-seco-A-nor-9β,10α-androstane-3-nitrile,
17β-hydroxy-17α-vinyl-5-oxo-3,5-seco-A-nor-9β,10α-androstane-3-nitrile,
17α-ethinyl-17β-hydroxy-5-oxo-3,5-seco-A-nor-9β,10α-androstane-3-nitrile,
5,17-dioxo-3,5-seco-A-nor-9β,10α-androstane-3-nitrile,
17β-hydroxy-1-methyl-5-oxo-3,5-seco-A-nor-9β,10α-androstane-3-nitrile,
17β-hydroxy-1-methoxy-5-oxo-3,5-seco-A-nor-9β,10α-androstane-3-nitrile,
17β-hydroxy-1-methylthio-5-oxo-3,5-seco-A-nor-9β,10α-androstane-3-nitrile,
17β-hydroxy-2-methyl-5-oxo-3,5-seco-A-nor-9β,10α-androstane-3-nitrile,
17β-hydroxy-6-methyl-5-oxo-3,5-seco-A-nor-9β,10α-androstane-3-nitrile,
6-acetylthio-17β-hydroxy-5-oxo-3,5-seco-A-nor-9β,10α-androstane-3-nitrile,
6-chloro-17β-hydroxy-5-oxo-3,5-seco-A-nor-9β,10α-androstane-3-nitrile,
17β-hydroxy-7-methyl-5-oxo-3,5-seco-A-nor-9β,10α-androstane-3-nitrile,
11,17β-dihydroxy-5-oxo-3,5-seco-A-nor-9β,10α-androstane-3-nitrile,
11-acetyl-17β-hydroxy-5-oxo-3,5-seco-A-nor-9β,10α-androstane-3-nitrile,
17β-hydroxy-16-methyl-5-oxo-3,5-seco-A-nor-9β,10α-androstane-3-nitrile,
16,17β-dihydroxy-5-oxo-3,5-seco-A-nor-9β,10α-androstane-3-nitrile,
5-oxo-3,5-seco-A-nor-9β,10α-androstane-3-nitrile
17β-hydroxy-17α-acetic acid lactone,
17β-hydroxy-5-oxo-3,5-seco-A-nor-9β,10α-androstan-3-oic acid,
17β-acetoxy-5-oxo-3,5-seco-A-nor-9β,10α-androstan-3-oic acid,
17β-benzoyloxy-5-oxo-3,5-seco-A-nor-9β,10α-androstan-3-oic acid,
17β-hydroxy-17α-methyl-5-oxo-3,5-seco-A-nor-9β,10α-androstan-3-oic acid,
17β-hydroxy-17α-vinyl-5-oxo-3,5-seco-A-nor-9β,10α-androstan-3-oic acid,
17β-hydroxy-17α-ethinyl-5-oxo-3,5-seco-A-nor-9β,10α-androstan-3-oic acid,
5,17-dioxo-3,5-seco-A-nor-9β,10α androstan-3-oic acid,
17β-hydroxy-1-methyl-5-oxo-3,5-seco-A-nor-9β,10α-androstan-3-oic acid,
17β-hydroxy-1-methoxy-5-oxo-3,5-seco-A-nor-9β,10α-androstan-3-oic acid,
17β-hydroxy-1-methylthio-5-oxo-3,5-seco-A-nor-9β,10α-androstan-3-oic acid,
17β-hydroxy-2-methyl-5-oxo-3,5-seco-A-nor-9β,10α-androstan-3-oic acid,
17β-hydroxy-6-methyl-5-oxo-3,5-seco-A-nor-9β,10α-androstan-3-oic acid,
6-acetylthio-17β-hydroxy-5-oxo-3,5-seco-A-nor-9β,10α-androstan-3-oic acid,
6-chloro-17β-hydroxy-5-oxo-3,5-seco-A-nor-9β,10α-androstan-3-oic acid,
17β-hydroxy-7-methyl-5-oxo-3,5-seco-A-nor-9β,10α-androstan-3-oic acid,
11,17β-dihydroxy-5-oxo-3,5-seco-A-nor-9β,10α-androstan-3-oic acid,
11-acetyl-17β-hydroxy-5-oxo-3,5-seco-A-nor-9β,10α-androstan-3-oic acid,
17β-hydroxy-16-methyl-5-oxo-3,5-seco-A-nor-9β,10α-androstan-3-oic acid,
16,17β-dihydroxy-5-oxo-3,5-seco-A-nor-9β,10α-androstan-3-oic acid,
5-oxo-3,5-seco-A-nor-9β,10α-androstan-3-oic acid,
17β-hydroxy-17α-acetic acid lactone, as well as the alkali metal salts and lower alkyl, for example, methyl, ethyl, or benzyl, esters of the foregoing acids; and pregnanes such as 5,20-dioxo-3,5-seco-A-nor-9β,10α-pregnane-3-nitrile,
5,20-dioxo-21-hydroxy-3,5-seco-A-nor-9β,10α-pregnane-3-nitrile,
21-chloro-5,20-dioxo-3,5-seco-A-nor-9β,10α-pregnane-3-nitrile,
5,20-dioxo-17α-methyl-3,5-seco-A-nor-9β,10α-pregnane-3-nitrile,
5,20-dioxo-17α-hydroxy-3,5-seco-A-nor-9β,10α-pregnane-3-nitrile,
17α-chloro-5,20-dioxo-3,5-seco-A-nor-9β,10α-pregnane-3-nitrile,
5,20-dioxo-1-methyl-3,5-seco-A-nor-9β,10α-pregnane-3-nitrile, 5,20-dioxo-2-methyl-3,5-seco-A-nor-9β,10α-pregnane-3-nitrile,
5,20-dioxo-6-methyl-3,5-seco-A-nor-9β,10α-pregnane-3-nitrile,
5,20-dioxo-7-methyl-3,5-seco-A-nor-9β,10α-pregnane-3-nitrile,
5,20-dioxo-11-hydroxy-3,5-seco-A-nor-9β,10α-pregnane-3-nitrile,
5,20-dioxo-16-methyl-3,5-seco-A-nor-9β,10α-pregnane-3-nitrile,
5,20-dioxo-16-hydroxy-3,5-seco-A-nor-9β,10α-pregnane-3-nitrile,
5,20-dioxo-16-methoxy-3,5-seco-A-nor-9β,10α-pregnane-3-nitrile,
5,20-dioxo-3,5-seco-A-nor-9β,10α-pregnan-3-oic acid,
5,20-dioxo-21-hydroxy-3,5-seco-A-nor-9β,10α-pregnan-3-oic acid,
21-chloro-5,20-dioxo-3,5-seco-A-nor-9β,10α-pregnan-3-oic acid,
5,20-dioxo-17α-methyl-3,5-seco-A-nor-9β,10α-pregnan-3-oic acid,
5,20-dioxo-17α-hydroxy-3,5-seco-A-nor-9β,10α-pregnan-3-oic acid,
17α-chloro-5,20-dioxo-3,5-seco-A-nor-9β,10α-pregnan-3-oic acid,
5,20-dioxo-1-methyl-3,5-seco-A-nor9β,10α-pregnan-3-oic acid,
5,20-dioxo-2-methyl-3,5-seco-A-nor-9β,10α-pregnan-3-oic acid,
5,20-dioxo-6-methyl-3,5-seco-A-nor-9β,10α-pregnan-3-oic acid,
5,20-dioxo-7-methyl-3,5-seco-A-nor-9β,10α-pregnan-3-oic acid,
5,20-dioxo-11-hydroxy-3,5-seco-A-nor-9β,10α-pregnan-3-oic acid,
5,20-dioxo-16-methyl-3,5-seco-A-nor-9β,10α-pregnan-3-oic acid,
5,20-dioxo-16-hydroxy-3,5-seco-A-nor-9β,10α-pregnan-3-oic acid,
5,20-dioxo-16-methoxy-3,5-seco-A-nor-9β,10α-pregnan-3-oic acid, as well as the alkali metal salts and lower alkyl esters of the foregoing acids.

The second step of the process of this invention comprises the cyclization of the compound of Formula VIIa to form the novel tetracyclic compounds of Formula VIII, as is illustreated by the following equation:

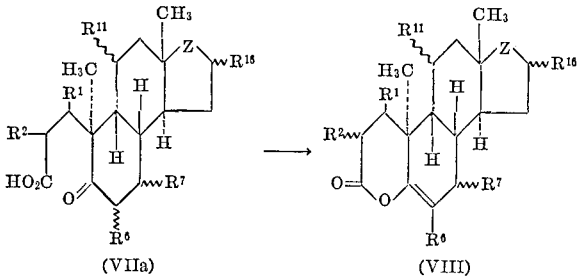

(VIIa)   (VIII)

wherein $R^1$, $R^2$, $R^6$, $R^7$, $R^{11}$, $R^{16}$, and Z are as previously defined.

This dehydration is conducted in known manner, as (1) by reaction of the compound of Formula VIIa with a dehydrating agent, for example, an organic acid anhydride, such as acetic anhydride, in admixture with an alkali metal salt of an organic acid, such as sodium acetate, or an organic acid halide, for example, acetyl chloride, or (2) by reaction of the compound of Formula VIIa with an acylating agent, such as acetic anhydride and an acid, such as perchloric acid or p-toluene sulfonic acid, preferably in the presence of an organic solvent, such as ethyl acetate or benzene, if desired, under heating of the reaction mixture.

Illustrative examples of the compounds of Formula VIII include androstenones such as 17β-hydroxy-4-oxa-9β,10α-androst-5-en-3-one,
17β-acetoxy-4-oxa-9β,10α-androst-5-en-3-one,
17β-benzoyloxy-4-oxa-9β,10α-androst-5-en-3-one,
17β-hydroxy-17αmethyl-4-oxa-9β,10α-androst-5-en-3-one,
17β-hydroxy-17α-vinyl-4-oxa-9β,10α-androst-5-en-3-one,
17α-ethinyl-17β-hydroxy-4-oxa-9β,10α-androst-5-en-3-one,
4-oxa-9β,10α-androst-5-en-3,17-dione,
17β-hydroxy-1-methyl-4-oxa-9β,10α-androst-5-en-3-one,
17β-hydroxy-1-methoxy-4-oxa-9β,10α-androst-5-en-3-one,
17β-hydroxy-1-methylthio-4-oxa-9β,10α-androst-5-en-3-one,
17β-hydroxy-2-methyl-4-oxa-9β,10α-androst-5-en-3-one,
17β-hydroxy-6-methyl-4-oxa-9β,10α-androst-5-en-3-one,
17βhydroxy-6-methylthio-4-oxa-9β,10α-androst-5-en-3-one,
6-acetylthio-17β-hydroxy-4-oxa-9β,10α-androst-5-en-3-one,
6-chloro-17β-hydroxy-4-oxa-9β,10α-androst-5-en-3-one,
17β-hydroxy-7-methyl-4-oxa-9β,10α-androst-5-en-3-one,
11,17β-dihydroxy-4-oxa-9β,10α-androst-5-en-3-one,
11-acetyl-17β-hydroxy-4-oxa-9β,10α-androst-5-en-3-one,
17β-hydroxy-16-methyl-4-oxa-9β,10α-androst-5-en-3-one,
16,17β-dihydroxy-4-oxa-9β,10α-androst-5-en-3-one,
4-oxa-9β,10α-androst-5-en-3-one,
17β-hydroxy-17α-acetic acid lactone,
and pregnenones such as 4-oxa-9β,10α-pregn-5-ene-3,20-dione,
21-hydroxy-4-oxa-9β,10α-pregn-5-ene-3,20-dione,
21-chloro-4-oxa-9β,10α-pregn-5-ene-3,20-dione,
17α-methyl-4-oxa-9β,10αpregn-5-ene-3,20-dione,
17α-hydroxy-4-oxa-9β,10α-pregn-5-ene-3,20-dione,
17α-chloro-4-oxa-9β,10α-pregn-5-ene-3,20-dione,
1-methyl-4-oxa-9β,10α-pregn-5-ene-3,20-dione,
2-methyl-4-oxa-9β,10α-pregn-5-ene-3,20-dione,
6-methyl-4-oxa-9β,10α-pregn-5-ene-3,20-dione,
7-methyl-4-oxa-9β,10α-pregn-5-ene-3,20-dione,
11-methyl-4-oxa-9β,10α-pregn-5-ene-3,20-dione,
16-methyl-4-oxa-9β,10α-pregn-5-ene-3,20-dione,
16-hydroxy-4-oxa-9β,10α-pregn-5-ene-3,20-dione,
16-methoxy-4-oxa-9β,10α-pregn-5-ene-3,20-dione,
and the like.

The final sequence of steps in the process of this invention comprises the aldolization of the compound of Formula VIII, followed by rearrangement and dehydration of the resulting compound of Formula IX to form a steroid of Formula I.

The aldolization is effected by reaction of the compound of Formula VIII with a compound having the formulae $R^4CH_2Li$ or $R^4CH_2MgX$ wherein $R^4$ is as previously defined and X is halogen, especially chlorine or bromine. Illustrative compounds include methyl lithium, ethyl lithium, benzyl lithium, methyl magnesium bromide, ethyl magnesium bromide, benzyl magnesium bromide, and the like. It is known in the normal steroid series that a Grignard reagent, for example, methyl magnesium bromide or benzyl magnesium bromide (see, for example, the preparation of the compounds of Formula IVf above) will react with an enol lactone to form an intermediate which, on treatment with an acid or base, rearranges to form an enone. It is also known that in the 10-epi-methyl-$\Delta^{9(11)}$-series the Grignard reaction proceeds with difficulty giving little, generally less than 10 percent, and frequently no enone. It is also reported that for the 10-epi-methyl-$\Delta^{9(11)}$-series, substitution of methyl lithium for methyl magnesium bromide results in reduced yields. Unexpectedly and surprisingly, alkyl lithium compounds are superior to Grignard reagents for reaction with members of the class of compounds represented by Formula VIII, affording considerably higher yields of the desired aldol. Accordingly, the alkyl lithium compounds of the formula $R^4CH_2Li$ are preferred.

The novel products of the aldolization are represented by the formula:

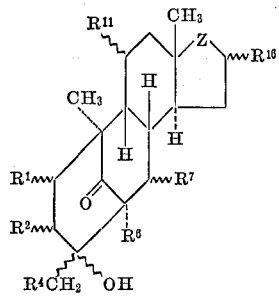

(IX)

wherein $R^1$, $R^2$, $R^4$, $R^6$, $R^{11}$, $R^{16}$, and Z are as previously defined.

Illustrative examples of these aldols include androstanes such as

3ξ,17β-dihydroxy-4,5-seco-3,6β-cyclo-9β,10α-androstan-5-one,
17β-acetoxy-3ξ-hydroxy-4,5-seco-3,6β-cyclo-9β,10α-androstan-5-one,
17β-benzoyloxy-3ξ-hydroxy-4,5-seco-3,6β-cyclo-9β,10α-androstan-5-one,
3ξ,17β-dihydroxy-17α-methyl-4,5-seco-3,6β-cyclo-9β,10α-androstan-5-one,
3ξ,17β-dihydroxy-17α-vinyl-4,5-seco-3,6β-cyclo-9β,10α-androstan-5-one,
3ξ,17β-dihydroxy-17α-ethinyl-4,5-seco-3,6β-cyclo-9β,10α-androstan-5-one,
3ξ-hydroxy-4,5-seco-3,6β-cyclo-9β,10α-androstan-5,17-dione,
3ξ,17β-dihydroxy-1-methyl-4,5-seco-3,6β-cyclo-9β,10α-androstan-5-one,
3ξ,17β-dihydroxy-1-methoxy-4,5-seco-3,6β-cyclo-9β,10α-androstan-5-one,
3ξ,17β-dihydroxy-1-methylthio-4,5-seco-3,6β-cyclo-9β,10α-androstan-5-one,
3ξ,17β-dihydroxy-2-methyl-4,5-seco-3,6β-cyclo-9β,10α-androstan-5-one,
3ξ,17β-dihydroxy-6α-methyl-4,5-seco-3,6β-cyclo-9β,10α-androstan-5-one,
6α-acetylthio-3ξ,17β-dihydroxy-4,5-seco-3,6β-cyclo-9β,10α-androstan-5-one,
6α-chloro-3ξ,17β-dihydroxy-4,5-seco-3,6β-cyclo-9β,10α-androstan-5-one,
3ξ,17β-dihydroxy-7-methyl-4,5-seco-3,6β-cyclo-9β,10α-androstan-5-one,
11-acetoxy-3ξ,17β-dihydroxy-4,5-seco-3,6β-cyclo-9β,10α-androstan-5-one,
3ξ,17β-dihydroxy-16-methyl-4,5-seco-3,6β-cyclo-9β,10α-androstan-5-one,
3ξ,16,17β-trihydroxy-4,5-seco-3,6β-cyclo-9β,10α-androstan-5-one,
3ξ-hydroxy-4,5-seco-3,6β-cyclo-9β,10α-androstan-5-one,
17β-hydroxy-17α-acetic acid lactone,
3ξ,17β-dihydroxy-4-methyl-4,5-seco-3,6β-cyclo-9β,10α-androstan-5-one,
3ξ,17β-dihydroxy-4-ethyl-4,5-seco-3,6β-cyclo-9β,10α-androstan-5-one,
3ξ,17β-dihydroxy-4-phenyl-4,5-seco-3,6β-cyclo-9β,10α-androstan-5-one, and pregnanes such as 3ξ-hydroxy-4,5-seco-3,6β-cyclo-9β,10α-pregnane-5,20-5,20-dione,
21-chloro-3ξ-hydroxy-4,5-seco-3,6β-cyclo-9β,10α-pregnane-5,20-dione,
3ξ-hydroxy-17α-methyl-4,5-sec-3,6β-cyclo-9β,10α-pregnane-5,20-dione,
3ξ,17α-dihydroxy-4,5-seco-3,6β-cyclo-9β,10α-pregnane-5,20-dione,
17α-chloro-3ξ-hydroxy-4,5-seco-3,6β-cyclo-9β,10α-pregnane-5,20-dione,
3ξ-hydroxy-1-methyl-4,5-seco-3,6β-cyclo-9β,10α-pregnane-5,20-dione,
3ξ-hydroxy-2-methyl-4,5-seco-3,6β-cyclo-9β,10α-pregnane-5,20-dione,
3ξ-hydroxy-6α-methyl-4,5-seco-3,6β-cyclo-9β,10α-pregnane-5,20-dione,
3ξ-hydroxy-7-methyl-4,5-seco-3,6β-cyclo-9β,10α-pregnane-5,20-dione,
3ξ,11-hydroxy-4,5-seco-3,6β-cyclo-9β,10α-pregnane-5,20-dione,
3ξ-hydroxy-16-methyl-4,5-seco-3,6β-cyclo-9β,10α-pregnane-5,20-dione,
3ξ-hydroxy-16-methoxy-4,5-seco-3,6β-cyclo-9β,10α-pregnane-5,20-dione,
3ξ-hydroxy-4-methyl-4,5-seco-3,6β-cyclo-9β,10α-pregnane-5,20-dione, and the like.

The reaction temperature is not narrowly critical, and can vary from 0° C. to about 100° C., with temperatures of from about 20° C. to about 40° C. being preferred. The reaction is preferably effected in the presence of a suitable solvent, such as ether, benzene, tetrahydrofuran, dioxane, or mixtures thereof.

The final step of rearrangement and dehydration of the aldols of Formula IX to produce the retrosteroids of Formula I is effected by treating the aldol of Formula IX with acid or base in known manner. Preferred are organic or inorganic acids such as hydrochloric or sulfuric acid or para-toluenesulfonic acid, and organic or inorganic bases such as sodium or potassium hydroxide or potassium tertiary butoxide. This reaction is preferably effected in a suitable solvent such as water, lower alkanols, for example, ethanol, propanol, or tertiary butanol, benzene, dioxane, or tetrahydrofuran. Other reaction conditions are not narrowly critical, although temperatures above about 100° C. are to be avoided with basic treatment to avoid the reverse Michael reaction.

The pharmaceutically useful compounds prepared by the methods of this invention can be administered internally, for example, orally or parenterally, with dosage adjusted to individual requirements. They can be administered in conventional pharmaceutical forms, e.g., capsules, tablets, suspensions, solutions, or the like.

The following examples are illustrative. In the examples, the assigned structures of the products were confirmed by infrared, ultraviolet, and/or nuclear magnetic resonance spectra, and/or elemental analysis.

EXAMPLE 1

17β - hydroxy - 5-oxo-3,5-seco-A-nor-9β,10α-androstane-3 - nitrile from 17β-hydroxy-9β,10β-desA-androstan-5-one To a solution of 5.9 g. of 17β-hydroxy-9β,10β-desA-androstan-5-one and 3.5 ml. of freshly distilled acrylonitrile in 250 ml. of anhydrous dioxane, which was stirred at room temperature, was added 21 ml. of a 40 percent benzyltrimethylammonium hydroxide solution in methanol. The reaction mixture so-obtained was stirred at room temperature for seven days, then cooled to 13–15° and acidified by addition of glacial acetic acid. After evaporation to dryness in vacuo, the residue was dissolved in 1000 ml. of chloroform. The last solution was extracted several times with 40–50 ml. portions of saturated aqueous sodium chloride solution, and after drying over anhydrous sodium sulfate, it was evaporated to dryness in vacuo. The residue was chromatographed on a silica gel column with a petroleum ether-ether system to give 17β-hydroxy-5-oxo-3,5-seco-A-nor-9β,10α-androstane-3-nitrile as an oil at room temperature.

EXAMPLE 2

17β-hydroxy-5-oxo-3,5-seco-A-nor-9β,10α-androstane-3-nitrile

A solution of potassium tertiary butoxide was prepared by dissolving 985 mg. of potassium in 100 ml. of anhydrous tertiary butanol, and after cooling to room temperature, it was combined with a solution of 5.9 g. of 17β-hydroxy-9β,10β-desA-androstan-5-one in 125 ml. of anhydrous tertiary butanol. After stirring for 30 minutes, a solution of 2.5 ml. of freshly distilled acrylonitrile in 25 ml. of anhydrous tertiary butanol was added, and the reaction mixture was left for 22 hours at room temperature. It was then acidified with 1.6 ml. of glacial acetic acid, and evaporated to dryness in vacuo. The residue was dissolved in 1 l. of chloroform, and the so-obtained solution was washed twice with 50 ml. of saturated sodium chloride solution, and, after drying over anhydrous magnesium sulfate, evaporated to dryness. The residue was chromatographed on a silica gel column with a petroleum ether-ether system to give 17β-hydroxy-5-oxo-3,5-seco-A-nor-9β,10α-androstane-3-nitrile, which was identical to the compound prepared in Example 1.

EXAMPLE 3

17β - acetoxy - 5 - oxo-A-nor-3,5-seco-9β,10α-androstan-3-oic acid from 17β-hydroxy-5-oxo-A-nor-3,5-seco-9β,10α-androstane-3-nitrile A mixture of 3.6 g. of 17β-hydroxy-5-oxo-A-nor-3,5-seco-9β,10α-androstane-3-nitrile in 160 ml. of 10 percent aqueous potassium hydroxide solution was refluxed for six hours. After cooling, it was diluted with 200 ml. of water and extracted with 200 ml. of ether. The ether extract was washed with 50 ml. of 2 N sodium carbonate solution. The carbonate layer was combined with the alkaline reaction mixture, and after cooling in an ice bath, acidified with concentrated hydrochloric acid. The resulting suspension was extracted with four 200-ml. portions of methylene chloride, and the combined extracts washed with 150 ml. of water, dried over anhydrous magnesium sulfate, and evaporated. The crude acid was dissilved in 15 ml. of pyridine and after the addition of 10 ml. of acetic anhydride left overnight at room temperature. It was then evaporated to dryness, and the residue chromatographed on a silica gel column with a methylene chloride-ether system to give crystalline 17β-acetoxy-5-oxo-A-nor-3,5-seco-9β,10α-androstan-3-oic acid. After recrystallization from ethanol it melted at 134–134.5°.

EXAMPLE 4

17β - hydroxy - 5-oxo-A-nor-3,5-seco-9β,10α-androstan-3-oic acid from 17β-hydroxy-5-oxo-A-nor-3,5-seco-9β,10α-androstane-3-nitrile A mixture of 1.35 g. of 17β-hydroxy-5-oxo-A-nor-3,5-seco-9β,10α-androstane-3-nitrile and 60 ml. of 10 percent potassium hydroxide solution was refluxed for 5.5 hours in a nitrogen atmosphere. It was then diluted with water to 500 ml. and extracted several times with ether. The combined ether extracts were washed with 250 ml. of 2 N sodium carbonate solution. The aqueous alkaline layers were combined, and after cooling in an ice bath, acidified with concentrated hydrochloric acid. The suspension so-obtained was extracted several times with methylene chloride. The combined organic extracts were washed with saturated sodium chloride solution, dried over anhydrous magnesium sulfate and evaporated to dryness. The residue was crystallized from a mixture of methylene chloride and isopropyl ether to give 17β-hydroxy-5-oxo-A-nor-3,5-seco-9β,10α-androstan-3-oic acid, M.P. 129–132°. An analytical sample was prepared by recrystallizations first from methylene chloride-petroleum ether and then from acetone-petroleum ether, M.P. 132–134°.

EXAMPLE 5

17β - hydroxy - 5-oxo-A-nor-3,5-seco-9β,10α-androstan-3-oic acid from 17β-acetoxy-5-oxo-A-nor-3,5-seco-9β,10α-androstan-3-oic acid A solution of 10 g. of 17β-acetoxy-5-oxo-A-nor-3,5-seco-9β,10α-androstan-3-oic acid and 6 g. of potassium hydroxide in 150 ml. of 75 percent aqueous methanol was refluxed for two hours, and then evaporated to dryness in vacuo. The residue was dissolved in 100 ml. of water, and after cooling to 0°, acidified with 20 percent hydrochloric acid. The resulting suspension was extracted with methylene chloride, the extract was washed with water, dried and evaporated. The residue was crystallized from ethyl acetate to yield 17β-hydroxy-5-oxo-A-nor-3,5-seco-9β,10α-androstan-3-oic acid, M.P. 132.5–133°.

EXAMPLE 6

17β-acetoxy-4-oxa-9β,10α-androst-5-en-3-one from 17β-acetoxy - 5 - oxo-A-nor-3,5-seco-9β,10α-androstan-3-oic acid A mixture of 3 g. of 17β-acetoxy-5-oxo-A-nor-3,5-seco-9β,10α-androstan-3-oic acid, 30 ml. of acetic anhydride and 400 mg. of anhydrous sodium acetate was refluxed for 2 hours, and then evaporated in vacuo. The residue was treated with water and extracted in ether. The ether extract was washed with water, dried and evaporated. The residue was crystallized from isopropyl ether to give 17β-acetoxy-4-oxa-9β,10α-androst-5-en-3-one, M.P. 92.5–93°.

EXAMPLE 7

17β-acetoxy-4-oxa-9β,10α-androst-5-en-3-one from 17β-hydroxy - 5-oxo-A-nor-3,5-seco-9β,10α-androstan-3-oic acid The experiment of Example 6 was repeated, except that 17β - hydroxy - 5-oxo-A-nor-3,5-seco-9β,10α-androstan-3-oic acid was substituted for 17β-acetoxy-5-oxo-A-nor-3,5-seco-9β,10α-androstan-3-oic acid.

EXAMPLE 8

17β-acetoxy-3ξ-hydroxy - 4,5 - seco-3,6β-cyclo-9β,10α-androstan-5-one and 3ξ,17β-dihydroxy-4,5-seco-3,6β-cyclo-9β,10α-androstan-5-one from 17β-acetoxy-4-oxa-9β,10α-androst-5-en-3-one To a solution of 1336 mg. of 17β-acetoxy-4-oxa-9β,10α-androst-5-en-3-one in 320 ml. of anhydrous benzene was added 3 mole equivalents of methyl lithium in ether solution, and the reaction mixture was left for 70 minutes at room temperature. After dilution with 600 ml. of benzene it was washed with 50 ml. of 1 N sodium thiosulfate solution and two 50-ml. portions of 15 percent sodium chloride solution, dried over anhydrous sodium sulfate and evaporated. The residue was chromatographed on a silica gel column with a petroleum ether-ether system. Oily 17β-acetoxy-3ξ-hydroxy - 4,5-seco-3,6β-cyclo-9β,10α-androstan-5-one was first eluted from the column, and then oily 3ξ,17β-dihydroxy-4,5-seco-3,6β-cyclo-9β,10α-androstan-5-one.

EXAMPLE 9

17β-acetoxy-9β,10α-androst-4-en-3-one and 17β-hydroxy-9β,10α-androst-4-en-3-one from 17β - acetoxy-3ξ-hydroxy - 4,5-seco-3,6β-cyclo-9β,10α-androstan-5-one and 3ξ,17β-dihydroxy-4,5-seco-3,6β-cyclo-9β,10α - androstan 5-one The solution of 2359 mg. of the crude mixture of 17β-acetoxy-3ξ-hydroxy-4,5-seco-3,6β - cyclo - 9β,10α - androstan-5-one and 3ξ,17β-dihydroxy-4,5-seco-3,6β - cyclo - 9β,10α-androstan-5-one, produced as described in Example 8, and 288 mg. of para-toluene sulfonic acid monohydrate in 400 ml. of anhydrous benzene was refluxed for 2 hours with azeotropic removal of the water formed in the reaction. After cooling the reaction mixture was diluted with 200 ml. of ether, then washed with 40 ml. of ice cold 7 percent aqueous sodium bicarbonate solution, 40 ml. of ice cold 1 N sodium hydroxide solution and three 40-ml. portions of ice cold water. The water layers were washed with two 400-ml. portions of ether. The organic layers were combined, dried over anhydrous sodium sulfate and evaporated to dryness in vacuo. The residue, an oil weighing 1957 mg. was chromatographed on a 60 g. silica gel (0.05–0.2 mm.) column with a petroleum ether-ether eluting system. From the column was first eluted 17β-acetoxy-9β,10α-androst-4-en-3-one, which after several recrystallizations from isopropyl ether-petroleum ether, melted at 113.5–114.5°. Later, 17β-hydroxy-9β,10α-androst-4-en-3-one was eluted from the column, and, after several recrystallizations from isopropyl ether-petroleum ether mixture, it melted at 156–156.5°.

EXAMPLE 10

17β-benzoyloxy-9β,10α-androst-4-en-3-one from 17β-acetoxy-3ξ-hydroxy - 4,5 - seco - 3,6β - cyclo-9β,10α-androstan-5-one and 3ξ,17β-dihydroxy-4,5-seco-3,6β-cyclo-9β,10α-androstan-5-one A solution of 2077 mg. of a crude mixture of 17β-acetoxy-3ξ-hydroxy - 4,5 - seco-3,6β-cyclo-9β,10α-androstan-5-one and 3ξ,17β-dihydroxy-4,5-seco-3,6β-cyclo-9β,10α-androstan-5-one obtained as described in Example 8 and one mole equivalent of potassium tertiary butoxide in 68 ml. of anhydrous tertiary butanol was stirred at room temperature for 10 minutes, then acidified with 1.5 ml. of acetic acid and evaporated. The residue was taken in 500 ml. of ether and washed with two 50-ml. portions of 10 percent aqueous sodium carbonate solution, and two 50-ml. portions of 15 percent aqueous sodium chloride solution, then dried over anhydrous sodium sulfate and evaporated. The residue was partially purified on a silica gel column, and 780 mg. of a fraction with ultraviolet absorption of ε 11500 was dissolved in 2.7 ml. of pyridine, and to this solution was added in portions a solution of 500 mg. of benzoyl chloride in 0.8 ml. of benzene. The reaction mixture was stirred at room temperature for 18 hours, then filtered, and the filtrate diluted with 400 ml. of ether. The ether solution was washed with 100 ml. of 5 percent sodium carbonate solution, 100 ml. of 18 percent hydrochloric acid, 100 ml. of 5 percent sodium carbonate solution and three 100-ml. portions of water, then dried over anhydrous sodium sulfate and evaporated. The residue was chromatographed on an aluminum oxide column to give crystalline 17β-benzoyloxy-9β,10α-androst-4-en-3-one, which after recrystallization from a methylene chloride-hexane mixture, melted at 155–156°.

EXAMPLE 11

17β-benzoyloxy-9β,10α-androst-4-en-3-one from 17β-hydroxy-9β,10α-androst-4-en-3-one To a solution of 2190 mg. of 17β-hydroxy-9β,10α-androst-4-en-3-one in 7.5 ml. of pyridine was added in portions a solution of 1260 mg. of benzoyl chloride in 2.25 ml. of benzene. The reaction mixture was stirred for 18 hours at room temperature, then filtered and the filtrate diluted with 500 ml. of ether. The ethereal solution was washed with 100 ml. of 5 percent sodium carbonate solution, 100 ml. of 18 percent hydrochloric acid, 100 ml. of 5 percent sodium carbonate solution and three 100-ml. portions of water, then dried over anhydrous sodium sulfate and evaporated. The residue was chromatographed on an aluminum oxide column with a benzene-petroleum ether system to give 17β-benzoyloxy-9β,10α-androst-4-en-3-one, which after three recrystallizations from a methylene chloride-hexane mixture melted at 155–156°.

EXAMPLE 12

5,17-dioxo-A-nor - 3,5 - seco-9β,10α-androstan-3-oic acid from 17β-hydroxy-5-oxo - A - nor-3,5-seco-9β,10α-androstan-3-oic acid To a stirred solution of 3 g. of 17β-hydroxy-5-oxo-A-nor-3,5-seco-9β,10α-androstan-3-oic acid in 80 ml. of acetone at 0°, was added 4 ml. of Jones reagent (0.016 mole of chromium trioxide equivalent), and the reaction mixture was stirred for 10 minutes. After addition of 10 ml. of methanol, the reaction mixture was evaporated in vacuo. After the addition of 50 ml. of water to the residue, the mixture was extracted with ether. The ethereal extract was washed with water, dried over anhydrous sodium sulfate and evaporated to dryness. The product, 5,17-dioxo-A-nor-3,5-seco-9β,10α-androstan-3-oic acid, was an oil, which crystallized upon the addition of petroleum ether. After recrystallization from ethylacetate, it melted at 128–128.5°.

EXAMPLE 13

4-oxa-9β,10α-androst-5-ene-3,17-dione from 5,17-dioxo-A-nor-3,5-seco-9β,10α-androstan-3-oic acid A mixture of 2.2 g. of 5,17-dioxo-A-nor-3,5-seco-9β,10α-androstan-3-oic acid, 20 ml. of acetic anhydride and 400 mg. of anhydrous sodium acetate was refluxed for 2 hours, and then evaporated to dryness in vacuo. To the residue was added water, and the resulting mixture was extracted with ether. The ether extract was washed with water, dried and evaporated, to give crystalline 4-oxa-9β,10α-androst-5-ene-3,17-dione, which after recrystallization from isopropyl ether melted at 116.5–117°.

Employing procedures similar to those described in Examples 8 and 9, the 4-oxa-9β,10α-androst-5-ene-3,17-dione is converted first to 3ξ-hydroxy-17β-oxo-4,5-seco-3,6β-cyclo-9β,10α-androstan-5-one and then to 9β,10α-androst-4-ene-3,17-dione.

EXAMPLE 14

17β-hydroxy - 17α - methyl-5-oxo-3,5-seco-A-nor-9β,10α-androstane-3-nitrile from 17β-hydroxy-17α-methyl-9β,10β-desA-androstan-5-one To a solution of 2 g. of 17β-hydroxy-17α-methyl-9β,10β-desA-androstan-5-one in 120 ml. of anhydrous freshly distilled tertiary butanol was added a solution of 8 millimoles of potassium tertiary butoxide in 80 ml. of anhydrous tertiary butanol, and, after stirring for 30 minutes, 1.06 ml. (16.2 millimoles) of freshly distilled acrylonitrile was added. The reaction mixture so obtained was stirred at room temperature for an additional five hours, and then acidified with 0.5 ml. of glacial acetic acid, and evaporated in vacuo. The residue was taken in 1.5 l. of chloroform, and the resulting solution washed with two 50-ml. portions of saturated sodium chloride solution, then dried over anhydrous magnesium sulfate and evaporated to dryness in vacuo. The crude product so-obtained was chromatographed on a silica gel column with a petroleum ether-ether system to give 17β-hydroxy-17α-methyl-5-oxo-3,5-seco-A-nor - 9β,10α - androstane-3-nitrile, which was distilled in high vacuum and crystallized from an acetone-ether-hexane mixture, M.P. 94.5–95.5°. The 17β-hydroxy - 17α - methyl-5-oxo-3,5-seco-A-nor-9β,10α-androstane-3-nitrile is then converted to the corresponding acid in the manner described in Example 4.

EXAMPLE 15

17β-acetoxy-17α-methyl-4-oxa-9β,10α - androst-5-en-3-one from 17β - hydroxy-17α-methyl-5-oxo-A-nor-3,5-seco-9β,10α-androstan-3-oic acid A mixture of 3 g. of 17β-hydroxy-17α-methyl-5-oxo-A-nor-3,5-seco-9β,10α-androstan-3-oic acid, 30 ml. of acetic anhydride and 0.5 g. of anhydrous sodium acetate was refluxed for 2 hours, and then evaporated. To the residue water was added and the mixture was extracted with methylene chloride. The organic extract was washed with water, dried, and evaporated, to give crystalline 17β-acetoxy - 17α-methyl - 4 - oxa-9β,10α-androst-5-en-3-one, which after recrystallization from ethylacetate melted at 171.5–174.5°.

EXAMPLE 16

17β-acetoxy-3ξ-hydroxy-17α-methyl-4,5-seco - 3,6β - cyclo-9β,10α-androstan-5-one from 17β-acetoxy-17α-methyl-4-oxa-9β,10α-androst-5-en-3-one To a stirred solution of 3.12 p. of 17β-acetoxy-17α-methyl-4-oxa-9β,10α-androst-5-en-3-one in 750 ml. of anhydrous benzene were added 3 mole equivalents of methyl lithium in ether solution, and the reaction mixture was left for 70 minutes at room temperature. After dilution with 600 ml. of benzene, it was washed with 50 ml. of 1 N sodium thiosulfate solution, and two 50-ml. portions of 15 percent sodium chloride solution, then dried over anhydrous magnesium sulfate, and evaporated. The residue was chromatographed on a silica gel column with a petroleum ether-ether system to give oily 17β-acetoxy-3ξ-hydroxy-17α-methyl-4,5-seco - 3,6β - cyclo-9β,10α-androstan-5-one.

EXAMPLE 17

17β-acetoxy-17α-methyl-9β,10α-androst-4-en-3-one and 17β-hydroxy-17α-methyl-9β,10α-androst-4-en-3-one The mixture, 2832 mg., obtained as described in Example 16, and containing in part 17β-acetoxy-3ξ-hydroxy-17α-methyl-4,5-seco-3,6β-cyclo-9β,10α-androstan - 5 - one, was dissolved in 300 ml. of benzene. To this solution was added 2 mole equivalents of potassium tertiary butoxide dissolved in tertiary butanol, and after 150 minutes the reaction mixture was evaporated to dryness. The residual red oil was dissolved in 800 ml. of methylene chloride, and the solution washed with two 400-ml. portions of water. The combined aqueous portions were re-extracted twice with 800 ml. of methylene chloride. The combined methylene chloride layers were dried over anhydrous sodium sulfate, and evaporated to dryness, to give 2396 mg. of a red oily residue. This residue was chromatographed on a 50 g. silica gel (0.05–0.2 mm.) column with a petroleum ether-ether eluting system. First from the column was eluted 17β-acetoxy-17α-methyl-9β,10α-androst-4-en-5-one, which melted at 143–144° after recrystallization from a mixture of methylene chloride-isopropyl ether-petroleum ether. Later from the column was eluted 17β-hydroxy-17α-methyl-9β,10α-androst-4-en-3-one, which after several recrystallizations from isopropyl ether-petroleum ether mixture melted at 129–129.5°.

EXAMPLE 18

20-oxo-9β,10α,17β-pregn-4-en-3-one from 20-ethylenedioxy-9β,10β-desA-17β-pregnan-5-one Employing techniques as described above, 20-ethylenedioxy-9β,10β-desA-17β-pregnan-5-one, produced by ketalization of 20-oxo-9β,10α,desA-pregnan-5-one with ethyleneglycol is reacted with acrylonitrile in the presence of benzyltrimethylammonium hydroxide to produce 20-ethylenedioxy - 3,5 - seco-A-nor-9β,10α,17β-pregnane-3-nitrile, which on refluxing with potassium hydroxide and acidification with hydrochloric acid yields the corresponding carboxylic acid. The 20-ethylenedioxy-5-oxo-A-nor-3,5-seco-9β,10α,17β-pregnan-3-oic acid is refluxed with acetic anhydride and sodium acetate, and the resulting 20-ethylenedioxy-4-oxa-9β,10α,17β - pregn-5-en-3-one reacted with methyl lithium to produce 20-ethylenedioxy-3ξ-hydroxy-4,5-seco-3,6β-cyclo-9β,10α,17β - pregnan - 5 - one, which, on refluxing with p-toluenesulfonic acid and benzene with azeotropic removal of water, yielded 20-ethylenedioxy-9β,10α,17β-pregn-4-en-3-one. Treatment of this product with acetic acid yields 9β,10α,17β-pregn-4-en-3, 20-dione.

We claim:
1. A compound represented by the formula

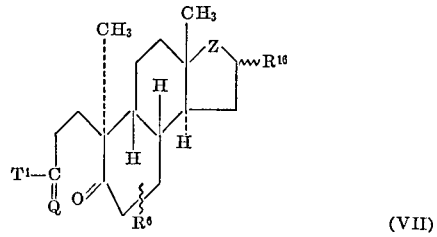

(VII)

wherein
R⁶ is a member in the 6- or 7-position selected from the group consisting of hydrogen, $C_1$–$C_3$ alkyl, lower alkanoylthio, fluorine, chlorine and bromine;
R¹⁶ is a member selected from the group consisting hydrogen, $C_1$–$C_3$ alkyl, hydroxy, lower alkanoyloxy, and, when the 17β-substituent is acetyl or substituted acetyl, fluorine;
Z is a member selected from the group consisting of carbonyl, (17β-hydroxy-17α-lower alkanoic acid lactone), and

R¹⁷ᵝ is a member selected from the group consisting of hydroxy, lower alkanoyloxy, and

Y is a member selected from the group consisting of hydrogen, hydroxy, fluorine, bromine and chlorine;
R¹⁷ᵅ, when R¹⁷ᵝ is hydroxy and lower alkanoyloxy, is a member selected from the group consisting of hydrogen, $C_1$–$C_6$ alkyl, $C_2$–$C_6$ alkenyl, and $C_2$–$C_6$ alknyl, and when R¹⁷ᵝ is

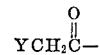

is a member selected from the group consisting of hydrogen $C_1$–$C_6$ alkyl, hydroxy, fluorine, bromine and chlorine;
Q, when taken alone, is oxo;
T¹, when taken alone, is a member selected from the group consisting of alkali metal oxy and lower alkoxy; and
T¹ and Q, when taken together, are nitrilo.
2. A compound as claimed in claim 1 represented by the formula:

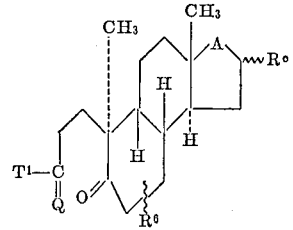

wherein
R⁶ is a member in the 6- or 7-position selected from the group consisting of hydrogen, $C_1$–$C_3$ alkyl, lower alkanoylthio, fluorine, chlorine and bromine;
A is a member selected from the group consisting of carbonyl, (17β-hydroxy-17α-lower alkanoic acid lactone), and

Rᵃ is a member selected from the group consisting of hydrogen and lower alkanoyl;

$R^b$ is a member selected from the group consisting of hydrogen, $C_1$–$C_6$ alkyl, $C_2$–$C_6$ alkenyl and $C_2$–$C_6$ alkynyl;

$R^c$ is a member selected from the group consisting of hydrogen, $C_1$–$C_3$ alkyl, hydroxy, and lower alkanoyloxy;

Q, when taken alone is oxo;

$T^1$, when taken alone, is a member selected from the group consisting of alkali metal oxy and lower alkoxy; and $T^1$ and Q, when taken together, are nitrilo.

3. A compound as claimed in claim 2 represented by the formula

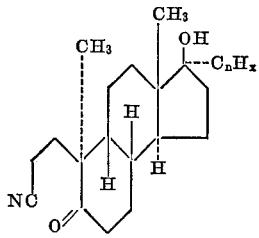

wherein
n is an integer having a value of from 0 to 6 and
x is an integer selected from the group consisting of those having a value represented by $2n+1$, $2n-1$, and $2n-3$ and lower alkanoic acid esters thereof.

4. A compound as claimed in claim 1 represented by the formula

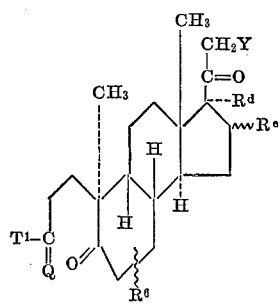

wherein
$R^6$ is a member in the 6- or 7-position selected from the group consisting of hydrogen, $C_1$–$C_3$ alkyl, lower alkylthio, lower alkanoylthio, fluorine, bromine and chlorine;

Y is a member selected from the group consisting of hydrogen, hydroxy, fluorine, bromine and chlorine;

Q, when taken alone, is oxo;

$T^1$, when taken alone, is a member selected from the group consisting of alkali metal oxy and lower alkoxy;

$T^1$ and Q, when taken together, are nitrilo;

$R^d$ is a member selected from the group consisting of hydrogen, $C_1$–$C_6$ alkyl, hydroxy, and fluoro; and $R^e$ is a member selected from the group consisting of hydrogen, $C_1$–$C_3$ alkyl, hydroxy, fluorine, bromine and chlorine.

5. A compound as claimed in claim 4 represented by the formula:

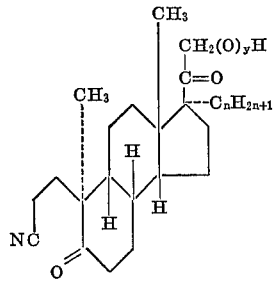

wherein
n is an integer having a value of from 0 to 6 and
y is an integer having a value of from 0 to 1.

6. A compound having the formula:

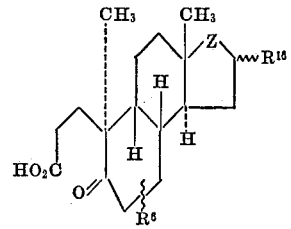

wherein
$R^6$ is a member in the 6- or 7-position selected from the group consisting of hydrogen, lower alkyl, lower alkanoylthio, fluorine, bromine and chlorine;

$R^{16}$ is a member selected from the group consisting of hydrogen, $C_1$–$C_3$ alkyl, hydroxy, lower alkanoyloxy, and, when the 17β-substituent is acetyl or substituted acetyl, fluorine;

Z is a member selected from the group consisting of carbonyl, (17β-hydroxy-17α-lower alkanoic acid lactone), and

$R^{17\beta}$ is a member selected from the group consisting of hydroxy, lower alkanoyloxy, and

Y is a member selected from the group consisting of hydrogen, hydroxy, fluorine, bromine and chlorine; and $R^{17\alpha}$, when $R^{17\beta}$ is hydroxy, and lower alkanoyloxy is a member selected from the group consisting of hydrogen, $C_1$–$C_6$ alkyl, $C_2$–$C_6$ alkenyl and $C_2$–$C_6$ alkynyl and, when $R^{17\beta}$ is

is a member selected from the group consisting of hydrogen, $C_1$–$C_6$ alkyl, hydroxy, fluorine and chlorine.

7. A compound as claimed in claim 6 having the formula:

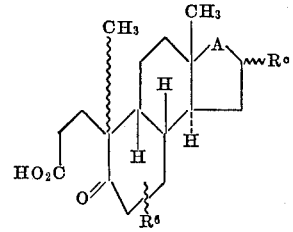

wherein
$R^6$ is a member in the 6- or 7-position selected from the group consisting of hydrogen, lower alkyl, lower alkanoylthio, fluorine, bromine and chlorine;

A is a member selected from the group consisting of carbonyl, (17β-hydroxy-17α-lower alkanoic acid lactone), and

$R^a$ is a member selected from the group consisting of hydrogen and lower alkanoyl;

$R^b$ is a member selected from the group consisting of hydrogen, $C_1$–$C_6$ alkenyl and $C_2$–$C_6$ alkynyl; and $R^c$ is a member selected from the group consisting of hydrogen, $C_1$–$C_3$ alkyl, hydroxy, and lower alkanoyloxy.

8. A compound as claimed in claim 7 having the formula:

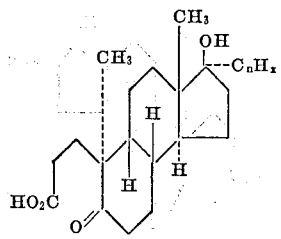

wherein
$n$ is an integer having a value of from 0 to 6 and
$x$ is an integer selected from the group consisting of those having a value represented by $2n+1$, $2n-1$, and $2n-3$ and lower alkanoic esters thereof.

9. A compound as claimed in claim 6 having the formula:

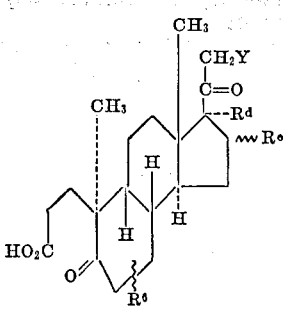

wherein
$R^6$ is a member in the 6- or 7-position selected from the group consisting of hydrogen, lower alkyl, lower alkanoylthio, fluorine, bromine and chlorine;
Y is a member selected from the group consisting of hydrogen, hydroxy, fluorine, bromine and chlorine;
$R^d$ is a member selected from the group consisting of hydrogen, $C_1$–$C_6$ alkyl, hydroxy, and fluoro; and
$R^e$ is a member selected from the group consisting of hydrogen, $C_1$–$C_3$ alkyl, hydroxy, fluorine, bromine and chlorine.

10. A compound as claimed in claim 9 having the formula:

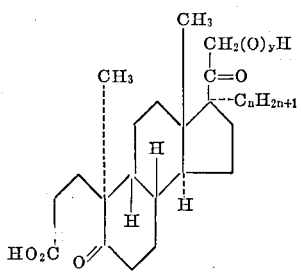

wherein
$n$ is an integer having a value of from 0 to 6 and
$y$ is an integer having a value of from 0 to 1.

References Cited
UNITED STATES PATENTS

| | | | |
|---|---|---|---|
| 2,883,424 | 4/1959 | Wildi | 260—586 |
| 2,897,202 | 7/1959 | Wildi | 260—287 |
| 2,951,074 | 8/1960 | Chemerda | 260—239.55 |
| 2,973,370 | 2/1961 | Atwater | 260—343.2 |
| 3,329,688 | 7/1967 | Edwards et al. | 260—343.2 |

JAMES A. PATTEN, Primary Examiner

U.S. Cl. X.R.

260—239.57, 340.9, 343.2, 345.9, 376, 397, 397.3, 397.4, 397.45, 397.47, 397.5, 455, 464, 476, 488, 505, 513, 514.5, 586, 964.

PO-1050
(5/69)

UNITED STATES PATENT OFFICE
CERTIFICATE OF CORRECTION

Patent No. 3,591,607      Dated July 6, 1971

Inventor(s) Furst, Koch and Uskokovic

It is certified that error appears in the above-identified patent and that said Letters Patent are hereby corrected as shown below:

Column 28, line 32 of claim 1

" $YCH_2-C$ "     should be     $\underline{YCH_2-\overset{O}{C}}$

Column 28, line 38 of claim 1

" alknyl "     should be     alkynyl

Column 30, lines 50 to 59

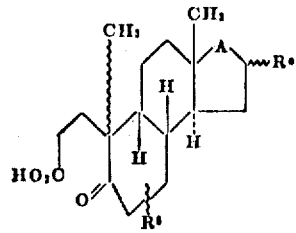 should be 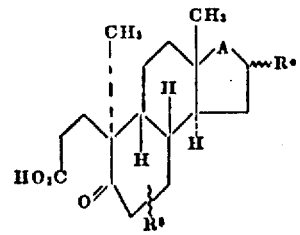

Column 30, line 74 in claim 7
"$C_1-C_6$ alkenyl" should be $\underline{C_1-C_6 \text{ alkyl}, C_2-C_6 \text{ alkenyl}}$ Signed and sealed this 28th day of March 1972.

(SEAL)
Attest:

EDWARD M. FLETCHER, JR.
Attesting Officer

ROBERT GOTTSCHALK
Commissioner of Patents